(12) United States Patent
Jin et al.

(10) Patent No.: US 11,527,959 B2
(45) Date of Patent: Dec. 13, 2022

(54) CONTROL METHOD OF POWER CONVERSION DEVICE

(71) Applicant: Delta Electronics, Inc., Taoyuan (TW)

(72) Inventors: Da Jin, Taoyuan (TW); Yahong Xiong, Taoyuan (TW); Qinghua Su, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 17/553,902

(22) Filed: Dec. 17, 2021

(65) Prior Publication Data

US 2022/0209684 A1   Jun. 30, 2022

(30) Foreign Application Priority Data

Dec. 30, 2020 (CN) .......................... 202011606900.2

(51) Int. Cl.
  *H02M 3/158* (2006.01)
  *H02M 1/00* (2006.01)
  *H02M 7/53846* (2007.01)
  *H02M 3/335* (2006.01)

(52) U.S. Cl.
  CPC ....... *H02M 3/1584* (2013.01); *H02M 1/0095* (2021.05); *H02M 1/0003* (2021.05); *H02M 1/0064* (2021.05); *H02M 3/33569* (2013.01); *H02M 7/53846* (2013.01)

(58) Field of Classification Search
  CPC ........... H02M 3/1584; H02M 3/33569; H02M 7/53846; H02M 1/0003; H02M 1/0064; H02M 1/0095
  See application file for complete search history.

(56) References Cited

U.S. PATENT DOCUMENTS

| | | | |
|---|---|---|---|
| 6,757,184 B2 | 6/2004 | Wei et al. | |
| 7,515,439 B2 * | 4/2009 | Leu ................... | H02M 3/33592 363/16 |
| 10,199,950 B1 | 2/2019 | Vinciarelli et al. | |
| 10,804,798 B1 * | 10/2020 | Rizzolatti ......... | H02M 3/33573 |
| 2013/0154589 A1 * | 6/2013 | Lethellier .............. | H02M 1/44 323/271 |
| 2017/0324326 A1 * | 11/2017 | Liu ........................ | H02M 1/08 |

(Continued)

*Primary Examiner* — Jue Zhang
(74) *Attorney, Agent, or Firm* — Kirton McConkie; Evan R. Witt

(57) ABSTRACT

The present disclosure provides a control method of a power conversion device including first and second bridge arms and two transformers. The first bridge arm includes the first, second and third switches serially connected. The second bridge arm includes the fourth, fifth and sixth switches serially connected. The control method includes: controlling the first and fourth switches to operate with duty cycle and being 180 degrees out of phase; controlling control signals of the third and fourth switches to be complementary, and controlling control signals of the sixth and first switches to be complementary; when the duty cycle being less than or equal to 0.5, controlling the second and fourth switches to switch synchronously, controlling the fifth and first switches to switch synchronously; and when the duty cycle being greater than 0.5, controlling the second and sixth switches to switch synchronously, controlling the fifth and third switches to switch synchronously.

14 Claims, 25 Drawing Sheets

(56) References Cited

U.S. PATENT DOCUMENTS

2021/0184586 A1\* 6/2021 Jin .......................... H02M 3/07
2021/0203233 A1\* 7/2021 Chang ................... H02M 3/077
2022/0006372 A1\* 1/2022 Jin ...................... H02M 3/1584

\* cited by examiner

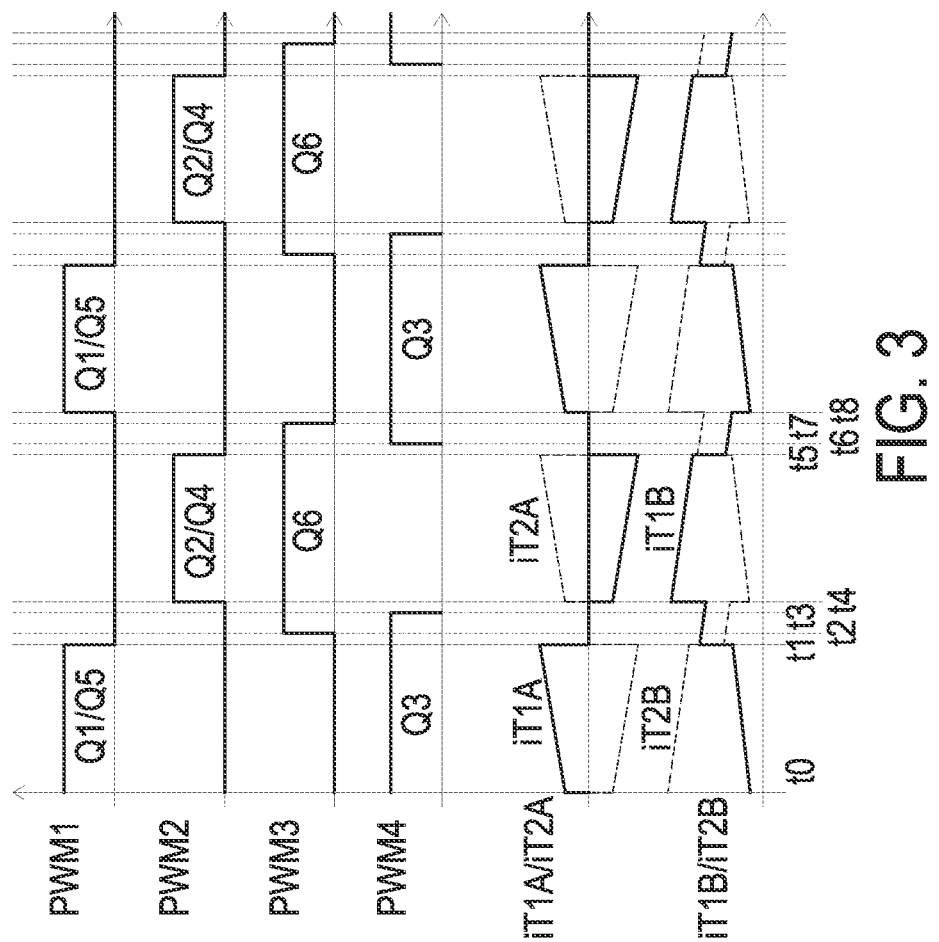

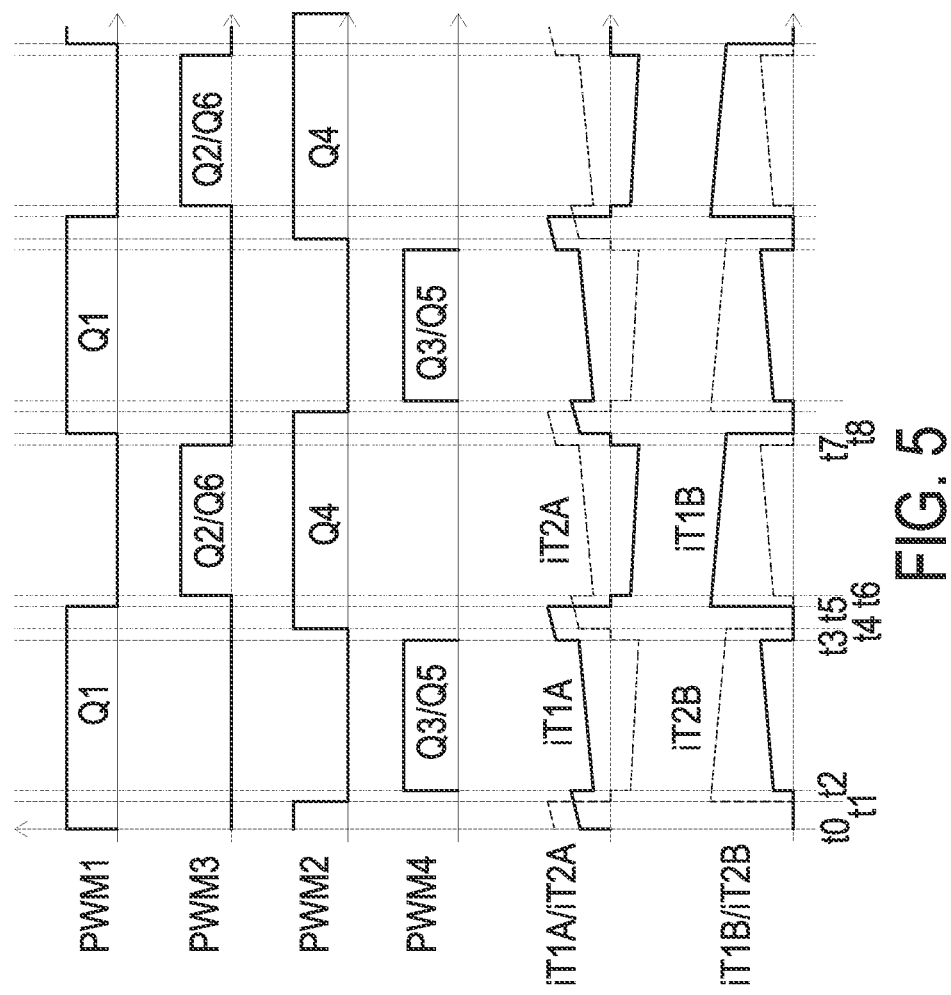

CONTROL METHOD OF POWER CONVERSION DEVICE

CROSS-REFERENCE TO RELATED APPLICATION

This application claims priority to China Patent Application No. 202011606900.2, filed on Dec. 30, 2020, the entire contents of which are incorporated herein by reference for all purposes.

FIELD OF THE INVENTION

The present disclosure relates to a control method, and more particularly to a control method of a power conversion device.

BACKGROUND OF THE INVENTION

With the rapid development of the Internet and artificial intelligence, the demand for power supplies with high efficiency and high power density is increasing. Conventionally, in response to the increase of required power, the bus voltage is stepped up from 12V to 54V to reduce the bus loss and cost, and a bus converter is further added to step down the bus voltage to 12V for power supply.

In order to obtain a high system conversion efficiency, the following two approaches are mostly used in the prior art bus converters for voltage conversion applications with 40V~60V input and 12V output. In the first approach, two magnetic-integrated buck converters with 180 degrees out of phase are utilized to regulate the output voltage by adjusting the duty cycle. Although the circuit of the first approach can be easily implemented, but the duty cycle is too small, and the voltage stress on the switch is high. The large size of magnetic element makes the poor performance of the converter. In the second approach, a magnetic-integrated hard-switching full-bridge converter is utilized to regulate the output voltage by adjusting the turns ratio of primary and secondary sides of transformer and the duty cycle. Although the circuit of the second approach is simple and reliable, but its duty cycle is limited to be less than 0.5, and the size of the magnetic element and the voltage stress on the secondary switches cannot be further reduced, which limits the performance of the converter. Moreover, the large number of the turns of the transformer in the second approach results in more layers of the PCB (printed circuit board) being required, thus leads to a significant increase in the cost of the converter.

Therefore, there is a need to develop a control method of a power conversion device that can overcome the drawbacks of the existing technology.

SUMMARY OF THE INVENTION

The present disclosure provides a control method of a power conversion device with low volt-second on the inductor of transformers, low voltage stress on switches, and small magnetic element. Accordingly, smaller magnetic element and switches with lower withstand voltage can be adopted to a power conversion device to reduce the cost and improve the power density.

In accordance with an aspect of the present disclosure, a control method for controlling a power conversion device is provided. In the first step, the power conversion device is provided. The power conversion device includes a first bridge arm, a second bridge arm and two transformers. The first bridge arm and the second bridge arm are electrically connected in parallel. The first bridge arm includes a first switch, a second switch and a third switch coupled in series. A first primary node is defined by a junction node between the first switch and the second switch, and a first secondary node is defined by a junction node between the second switch and the third switch. The second bridge arm includes a fourth switch, a fifth switch and a sixth switch coupled in series. A second primary node is defined by a junction node between the fourth switch and the fifth switch, and a second secondary node is defined by a junction node between the fifth switch and the sixth switch. Each of the two transformers includes a primary winding and a secondary winding. Two said primary windings of the two transformers are coupled in series between the first primary node and the second primary node, and two said secondary windings of the two transformers are coupled in series between the first secondary node and the second secondary node. In the second step, the first switch and the fourth switch are controlled to operate with a duty cycle. A control signal of the first switch and a control signal of the fourth switch have a phase difference by 180 degrees with respect to each other. In the third step, the third switch and the fourth switch are controlled, wherein a control signal of the third switch and the control signal of the fourth switch are complementary. In the fourth step, the sixth switch is controlled, wherein a control signal of the sixth switch and the control signal of the first switch are complementary. When the duty cycle is less than or equal to 0.5, the second switch and the fourth switch are turned on or turned off synchronously, and the fifth switch and the first switch are turned on or turned off synchronously. When the duty cycle is greater than 0.5, the second switch and the sixth switch are turned on or turned off synchronously, and the fifth switch and the third switch are turned on or turned off synchronously.

BRIEF DESCRIPTION OF THE DRAWINGS

FIG. 3 is a schematic oscillogram showing the main waveforms of the power conversion device of FIG. 1 when the duty cycle being less than or equal to 0.5;

FIG. 5 is a schematic oscillogram showing the main waveforms of the power conversion device of FIG. 1 when the duty cycle being greater than 0.5;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
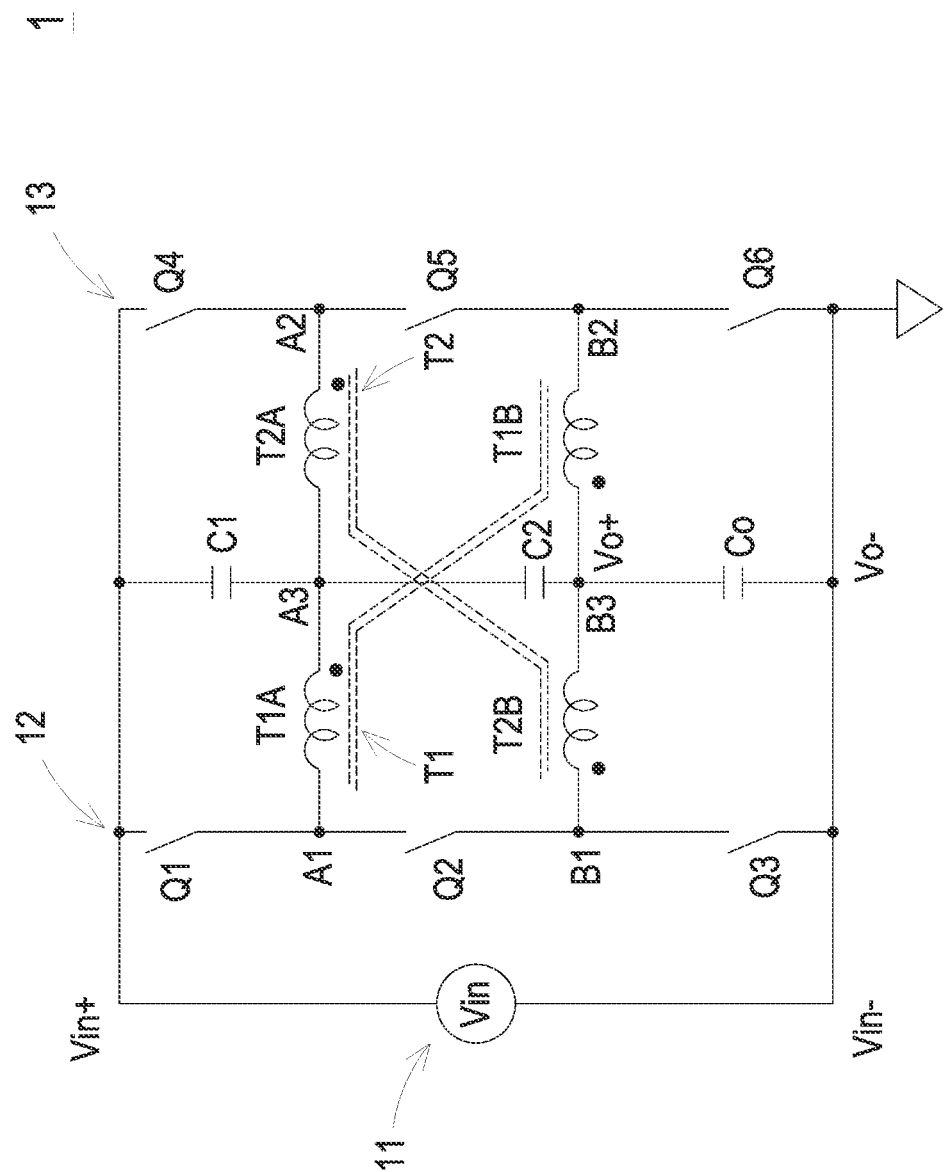
FIG. 1 is a schematic circuit diagram illustrating a power conversion device according to an embodiment of the present disclosure.

FIG. 1 is a schematic circuit diagram illustrating a power conversion device according to an embodiment of the present disclosure. As shown in FIG. 1, the power conversion device 1 includes an input end, a first bridge arm 12, a second bridge arm 13, two transformers T1, T2, and an output capacitor Co. The input end is electrically connected to a DC voltage source 11, and has a positive input terminal Vin+ and a negative input terminal Vin−. The DC voltage source 11 provides an input voltage Vin which is a DC voltage.

The first bridge arm 12 is connected to the input end in parallel, and includes a first switch Q1, a second switch Q2 and a third switch Q3 coupled in series. The first switch Q1 and the third switch Q3 are electrically connected to the positive input terminal Vin+ and the negative input terminal Vin− respectively. There is a first primary node A1 defined by the junction between the first switch Q1 and the second switch Q2, and there is a first secondary node B1 defined by the junction between the second switch Q2 and the third switch Q3.

The second bridge arm 13 is connected to the input end in parallel, and includes a fourth switch Q4, a fifth switch Q5 and a sixth switch Q6 coupled in series. The fourth switch Q4 and the sixth switch Q6 are electrically connected to the positive input terminal Vin+ and the negative input terminal Vin− respectively. There is a second primary node A2 defined by the junction between the fourth switch Q4 and the fifth switch Q5, and there is a second secondary node B2 defined by the junction between the fifth switch Q5 and the sixth switch Q6. The switches in the first bridge arm 12 and the second bridge arm 13 are for example but not limited to MOSFETs (metal-oxide-semiconductor field-effect transistor), SiC switches or GaN switches. In an embodiment, the third switch Q3 and the sixth switch Q6 may be diodes.

Each transformer (T1, T2) includes a primary winding (T1A, T2A) and a secondary winding (T1B, T2B) coupled to each other. The two secondary windings T1A and T2A of the two transformers T1 and T2 are coupled in series between the first primary node A1 and the second primary node A2. The dotted and undotted terminals of the two primary windings T1A and T2A respectively are electrically connected to form a third primary node A3. The two secondary windings T1B and T2B of the two transformers T1 and T2 are coupled in series between the first secondary node B1 and the second secondary node B2. The dotted and undotted terminals of the two secondary windings T1B and T2B respectively are electrically connected to form a third secondary node B3. The turns ratio of the primary windings T1A and T2A and the secondary windings T1B and T2B is N:N:1:1, where N is a positive integer.

Two terminals of the output capacitor Co are electrically connected to the positive output terminal Vo+ and the negative output terminal Vo− respectively. The positive output terminal Vo+ is coupled to the third secondary node B3, and the negative output terminal Vo− is coupled to the negative input terminal Vin−. The positive output terminal Vo+ and the negative output terminal Vo− form an output terminal, and the voltage between the positive output terminal Vo+ and the negative output terminal Vo− is an output voltage Vo.

In an embodiment, the power conversion device 1 further includes a controller (not shown), and the controller is configured to control the operation of the switches in the first bridge arm 12 and the second bridge arm 13.

In the embodiment shown in FIG. 1, the power conversion device 1 further includes a first capacitor C1 and a second capacitor C2. Two terminals of the first capacitor C1 are electrically connected to the positive input terminal Vin+ and the third primary node A3 respectively. Two terminals of the second capacitor C2 are electrically connected to the third primary node A3 and the third secondary node B3 respectively. In addition, in this embodiment, the two transformers are a first transformer T1 and a second transformer T2 respectively. The primary winding T1A of the first transformer T1 is electrically connected between the first primary node A1 and the third primary node A3. The secondary winding T1B of the first transformer T1 is electrically connected between the second secondary node B2 and the third secondary node B3. The primary winding T2A of the second transformer T2 is electrically connected between the second primary node A2 and the third primary node A3. The secondary winding T2B of the second transformer T2 is electrically connected between the first secondary node B1 and the third secondary node B3.

Figure 2:
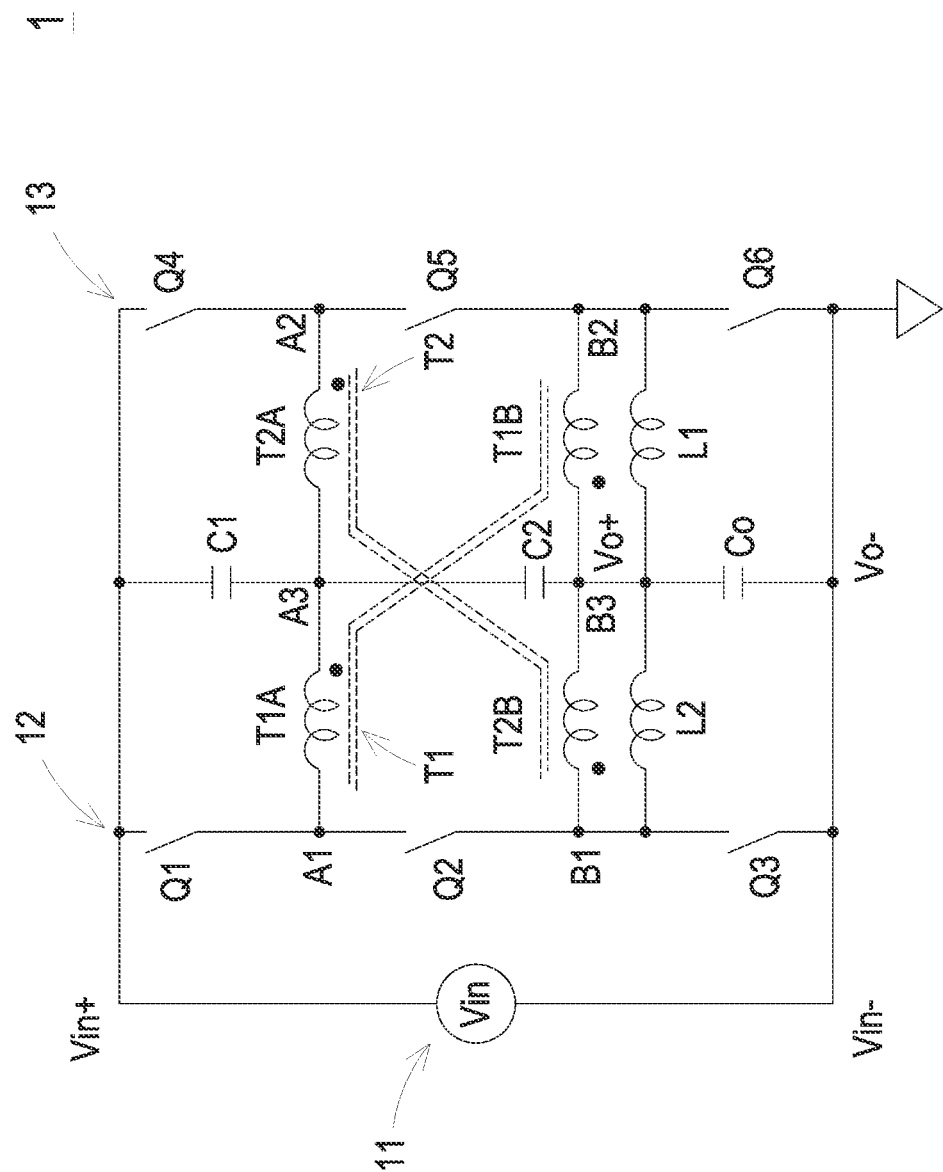
FIG. 2 schematically shows magnetizing inductances of the transformers of the power conversion device of FIG. 1.

FIG. 2 schematically shows an equivalent circuit of the power conversion device in FIG. 1, and the magnetizing inductances of the transformers are shown in FIG. 2. As shown in FIG. 2, the magnetizing inductance L1 of the first transformer T1 can be equivalently connected in parallel with the secondary winding T1B of the first transformer T1, and the magnetizing inductance L2 of the second transformer T2 can be equivalently connected in parallel with the secondary winding T2B of the second transformer T2, but not limited thereto. In other embodiments, the magnetizing inductance L1 of the first transformer T1 can be equivalently connected in parallel to the primary winding T1A of the first transformer T1, and the magnetizing inductance L2 of the second transformer T2 can be equivalently connected in parallel to the primary winding T2A of the second transformer T2.

The working states and waveforms of the power conversion device 1 of FIG. 1 with the duty cycle D less than or equal to 0.5 and with the duty cycle D greater than 0.5 would be described respectively as follows.

FIG. 3 is a schematic oscillogram showing the main waveforms of the power conversion device of FIG. 1 when the duty cycle is less than or equal to 0.5. FIG. 4A, FIG. 4B, FIG. 4C and FIG. 4D schematically show the working states of the power conversion device of FIG. 1 when the duty cycle is less than or equal to 0.5. As shown in FIG. 3, the time t0 to t8 is one working cycle. The first switch Q1 and the fourth switch Q4 operate with the duty cycle D, and the switching sequences of the first switch Q1 and the fourth switch Q4 are 180 degrees out of phase with respect to each other. The control signals of the third switch Q3 and the fourth switch Q4 are complementary, and the control signals of the sixth switch Q6 and the first switch Q1 are complementary. The second switch Q2 and the fourth switch Q4 are turned on or turned off synchronously, and the fifth switch Q5 and the first switch Q1 are turned on or turned off synchronously. In order to realize the switching operation of the switches, in some embodiments, the controller can be utilized to output a first control signal PWM1, a second control signal PWM2, a third control signal PWM3 and a fourth control signal PWM4 for controlling the said switches. The first control signal PWM1 and the second control signal PWM2 have the duty cycle D and are 180 degrees out of phase with respect to each other. The third control signal PWM3 and the first control signal PWM1 are complementary, and the fourth control signal PWM4 and the second control signal PWM2 are complementary. The first switch Q1 and the fifth switch Q5 are controlled by the first control signal PWM1. The second switch Q2 and the fourth switch Q4 are controlled by the second control signal PWM2. The sixth switch Q6 is controlled by the third control signal PWM3. The third switch Q3 is controlled by the fourth control signal PWM4.

Figure 4A:
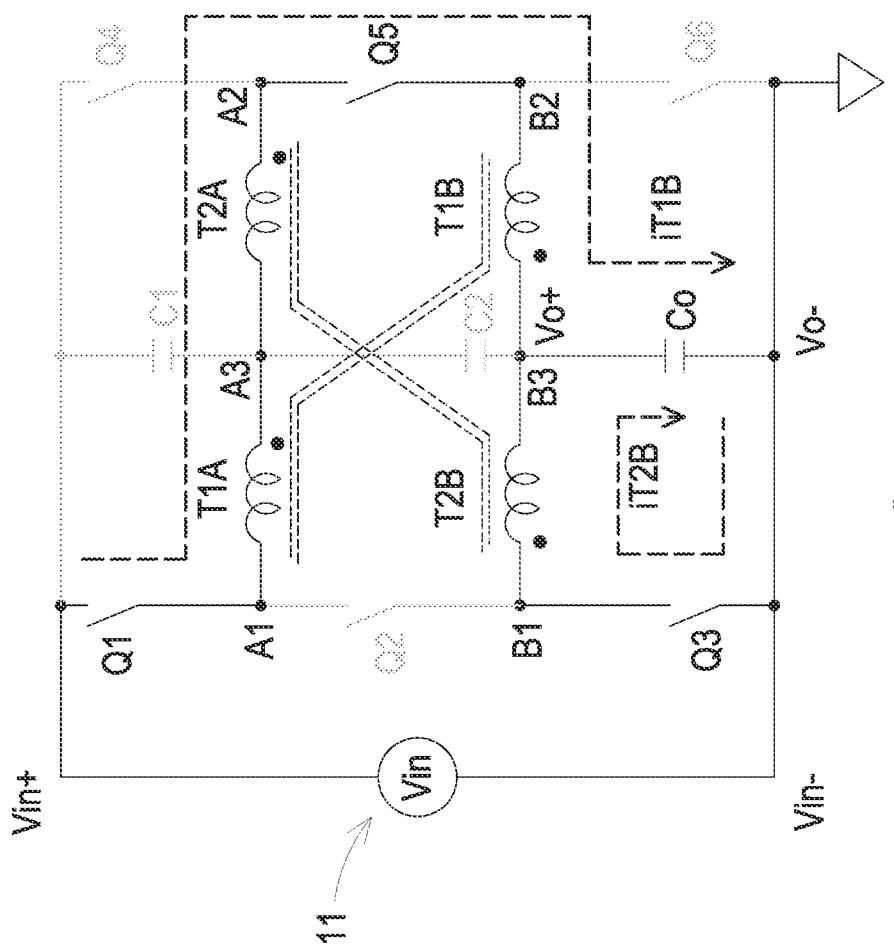
FIG. 4A, FIG. 4B, FIG. 4C and FIG. 4D schematically show the working states of the power conversion device of FIG. 1 when the duty cycle being less than or equal to 0.5.

Referring to FIG. 3 and FIG. 4A, the first, third and fifth switches Q1, Q3 and Q5 are in the "ON" state, the second, fourth and sixth switches Q2, Q4 and Q6 are in the "OFF" state during the period t0 to t1, the corresponding working states of the power conversion device 1 is shown in FIG. 4A. The primary windings T1A and T2A and the secondary windings T1B and T2B are sequentially connected in series to form a serial branch circuit. During this period, the input voltage Vin is applied directly on two terminals of the serial branch, and the input voltage Vin is superimposed between the negative input terminal Vin− and the first primary node A1 by conducting the first switch Q1 and the fifth switch Q5. Since the third switch Q3 is turned on, the voltage across the secondary winding T2B of the second transformer T2 is clamped by the output voltage Vo. Moreover, since the primary winding T2A and the secondary winding T2B of the second transformer T2 are coupled to each other and the turns ratio thereof is N:1, the voltage across the primary winding T2A of the second transformer T2 is clamped by N*Vo. In addition, since the primary winding T1A and the secondary winding T1B of the first transformer T1 are coupled to each other and the turns ratio thereof is N:1, the voltage across the secondary winding T1B of the first transformer T1 is (Vin−2*N*Vo)/2, and the magnetizing current flowing through the first transformer T1 increases in a positive direction. In other words, the current iT1B flowing through the secondary winding T1B increases in the positive direction, where the positive direction of the current iT1B is indicated by the arrow line in FIG. 4A. Thereby, the magnetizing inductance of the first transformer T1 stores energy. During the period from t0 to t1, the volt-second of the first transformer T1 is (Vin−2*N*Vo)*D*Ts, where Ts is the switching cycle (namely equal to the time length from time t0 to t8). In addition, during the period from t0 to t1, the magnetizing current flowing through the second transformer T2 decreases in a positive direction. In other words, the current iT2B flowing through the secondary winding T2B decreases in the positive direction, where the positive direction of the current iT2B is indicated by the arrow line in FIG. 4A. Thereby, the magnetizing inductance of the second transformer T2 releases energy to the output terminal. In conclusion, during the period from t0 to t1, the power conversion device 1 receives power from the DC voltage source 11 and stores energy in the first transformer T1 while outputting power to the output terminal.

Figure 4B:
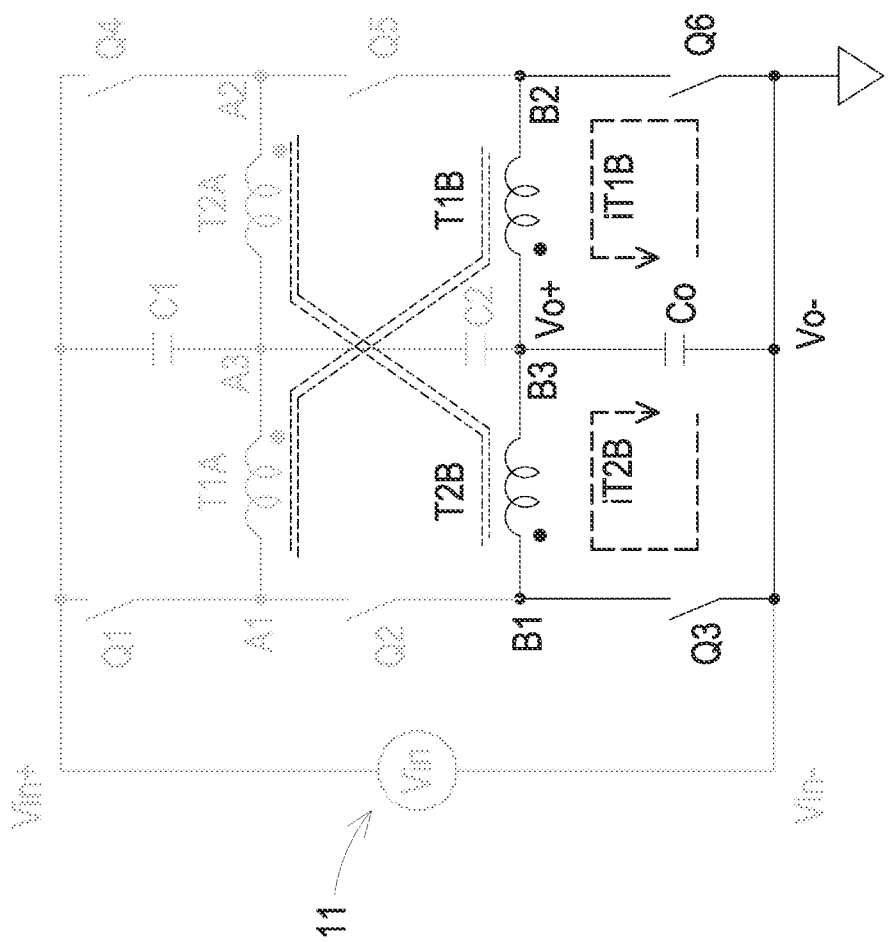

Referring to FIG. 3 and FIG. 4B, the third and sixth switches Q3 and Q6 are in the "ON" state, the first, second, fourth and fifth switches Q1, Q2, Q4 and Q5 are in the "OFF" state during the period from t2 to t3, the corresponding working states of the power conversion device 1 is shown in FIG. 4B. The DC voltage source 11 at the input end is disconnected, and the magnetizing currents flowing through the first transformer T1 and the second transformer T2 decrease in the positive direction at the same time. During the period from t2 to t3, the power conversion device 1 transmits the energy stored in the transformers to the output terminal.

Figure 4C:
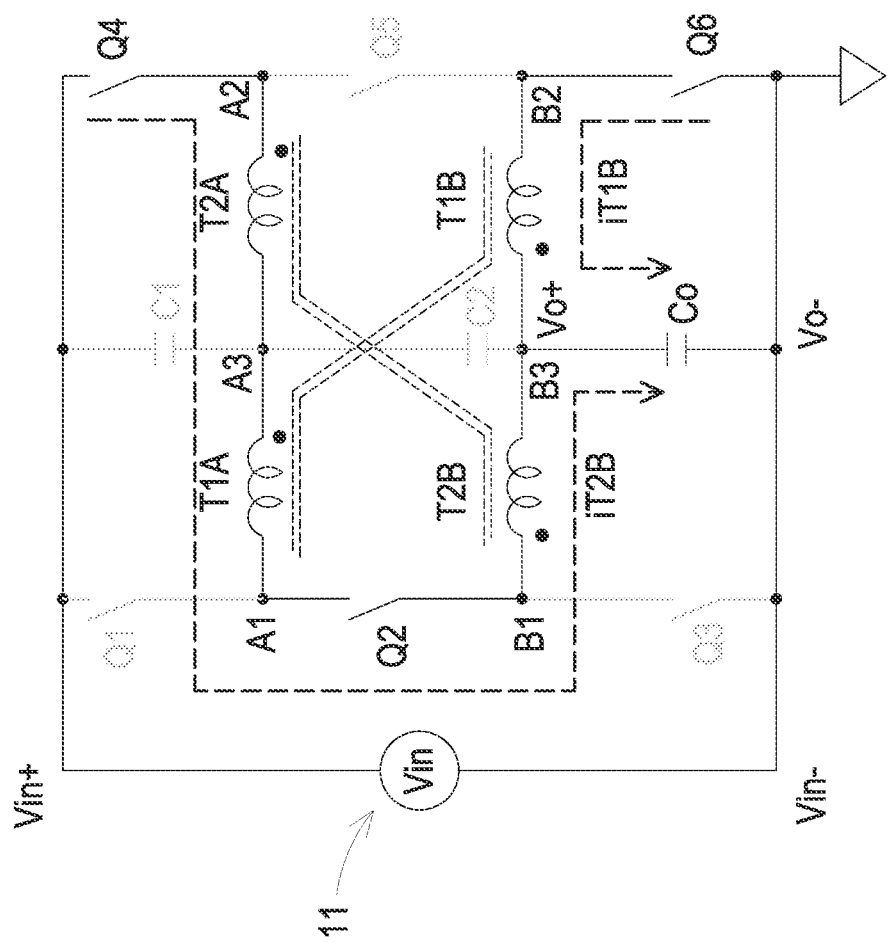

Referring to FIG. 3 and FIG. 4C, the second, fourth and sixth switches Q2, Q4 and Q6 are in the "ON" state, the first, third and fifth switches Q1, Q3 and Q5 are in the "OFF" state during the period from t4 to t5, the corresponding working states of the power conversion device 1 is shown in FIG. 4C. The primary windings T2A and T1A and the secondary windings T2B and T1B are sequentially connected in series to form a serial branch. During this period, the input voltage Vin is directly applied on two terminals of the serial branch, and the input voltage Vin is superimposed between the negative input terminal Vin− and the second primary node A2 by conducting the fourth switch Q4 and the sixth switch Q6. Since the sixth switch Q6 is turned on, the voltage across the secondary winding T1B of the first transformer T1 is clamped by the output voltage Vo. Moreover, since the primary winding T1A and the secondary winding T1B of the first transformer T1 are coupled to each other and the turns ratio thereof is N:1, the voltage across the primary winding T1A of the first transformer T1 is clamped by N*Vo. In addition, since the primary winding T2A and the secondary winding T2B of the second transformer T2 are coupled to each other and the turns ratio thereof is N:1, the voltage across the secondary winding T2B of the second transformer T2 is (Vin−2*N*Vo)/2, and the magnetizing current flowing through the second transformer T2 increases in the positive direction. Thereby, the magnetizing inductance of the second transformer T2 stores energy. During the period from t4 to t5, the volt-second of the second transformer T2 is (Vin−2*N*Vo)*D*Ts. In addition, during the period from t4 to t5, the magnetizing current flowing through the first transformer T1 decreases in the positive direction. Thereby, the magnetizing inductance of the first transformer T1 releases energy to the output terminal. In conclusion, during the period from time t4 to t5, the power conversion device 1 receives power from the DC voltage source 11 and stores energy in the second transformer T2, while outputting power to the output terminal.

Figure 4D:
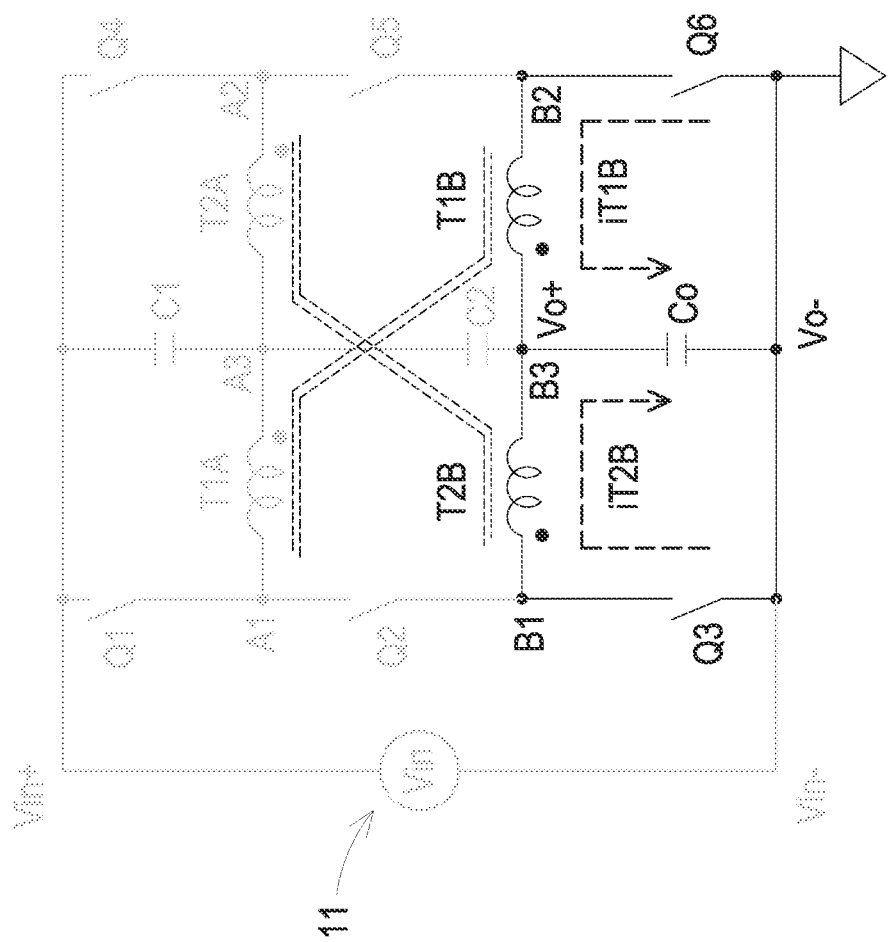

Referring to FIG. 3 and FIG. 4D, the third and sixth switches Q3 and Q6 are in the "ON" state, and the first, second, fourth and fifth switches Q1, Q2, Q4 and Q5 are in the "OFF" state during the period from t6 to t7, and the corresponding working states of the power conversion device 1 is shown in FIG. 4D. Since the working states shown in FIG. 4D is the same as the working states shown in FIG. 4B, the detailed descriptions thereof are omitted herein.

In FIG. 3, the period from t1 to t2, the period from time t3 to t4, the period from time t5 to t6, and the period from time t7 to t8 are the dead time. During the dead time, the current is only commutated through the parasitic diode or parasitic capacitance of switch.

With the duty cycle D is less than or equal to 0.5, in one switching cycle Ts (i.e., during the period from time t0 to t8 in FIG. 3), the volt-second is (Vin−2*N*Vo)*0.5*Ts when the magnetizing current flowing through the first transformer T1 increases in the positive direction and the volt-second is Vo*(1−D)*Ts when the magnetizing current flowing through the first transformer T1 decreases in the positive direction. According to turns ratio of the transformers and the volt-second balance of the magnetic elements, the following equation is obtained:

$$[Vin-(N+1)*Vo]*D*Ts/(1+N)=Vo*(1-D)*Ts.$$

The output voltage Vo is formulated by simplifying the above equation as: Vo=Vin*D/(1+N).

FIG. 5 is a schematic oscillogram showing the main waveforms of the power conversion device of FIG. 1 when the duty cycle being greater than 0.5. FIG. 6A, FIG. 6B, FIG. 6C and FIG. 6D schematically show the working states of the power conversion device of FIG. 1 with the duty cycle greater than 0.5. As shown in FIG. 5, the period from time t0 to t8 is one working cycle. The first switch Q1 and the fourth switch Q4 operate with the duty cycle D, and the switching sequences of the first switch Q1 and the fourth switch Q4 are 180 degrees out of phase with respect to each other. The control signals of the third switch Q3 and the fourth switch Q4 are complementary, and the control signals of the sixth switch Q6 and the first switch Q1 are complementary. The second switch Q2 and the sixth switch Q6 are turned on or turned off synchronously, and the fifth switch Q5 and the third switch Q3 are turned on or turned off synchronously. In order to realize the switching operation of the switches, in some embodiments, the said switches may be controlled through the first control signal PWM1, the second control signal PWM2, the third control signal PWM3 and the fourth control signal PWM4 outputted by the controller. The relations between the control signals are the same as that described above, and thus the detailed descriptions thereof are omitted herein. When the duty cycle D is greater than 0.5, the first switch Q1 is controlled by the first control signal PWM1, the fourth switch Q4 is controlled by the second control signal PWM2, the second switch Q2 and the sixth switch Q6 are controlled by the third control signal PWM3, and the third switch Q3 and the fifth switch Q5 are controlled by the fourth control signal PWM4.

Figure 6A:
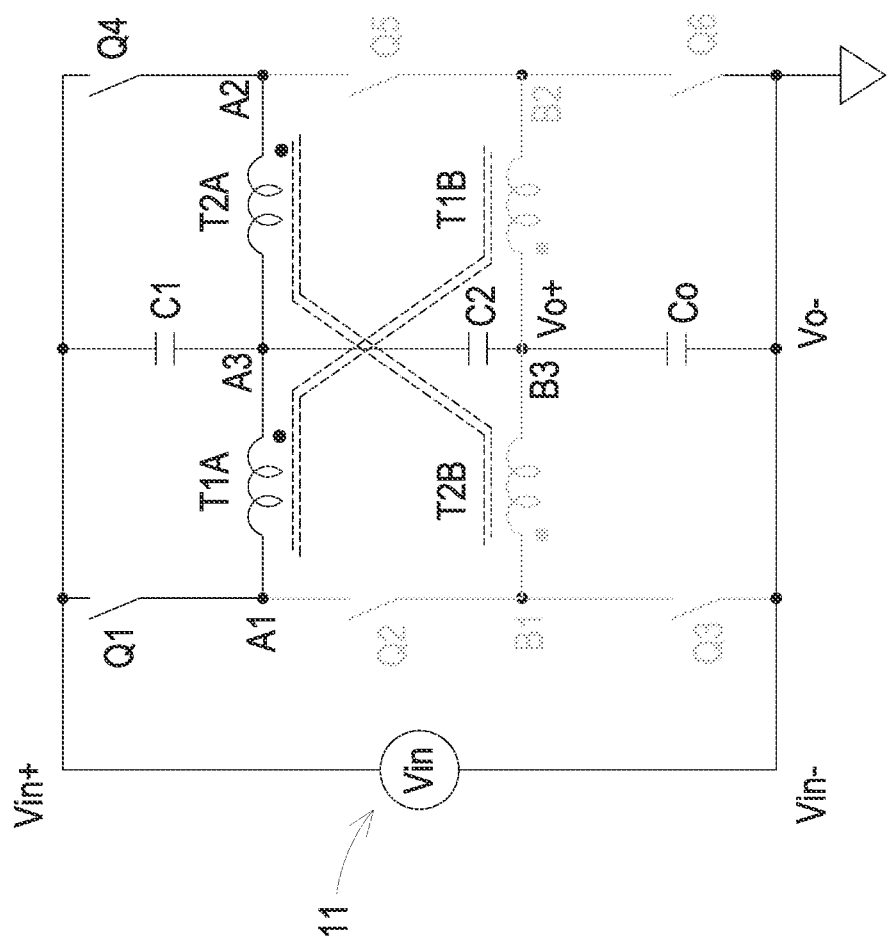
FIG. 6A, FIG. 6B, FIG. 6C and FIG. 6D schematically show the working states of the power conversion device of FIG. 1 when the duty cycle being greater than 0.5.

Referring to FIG. 5 and FIG. 6A, the first and fourth switches Q1 and Q4 are in the "ON" state, and the second, third, fifth and sixth switches Q2, Q3, Q5 and Q6 are in the "OFF" state during the period from t0 to t1, and the corresponding working states of the power conversion device 1 is shown in FIG. 6A. During this period, the DC voltage source 11 at the input end transmits power to the output terminal through the primary windings T1A and T2A and the second capacitor C2. The magnetizing currents flowing through the first transformer T1 and the second transformer T2 increases in the positive direction simultaneously, and the two transformers T1 and T2 store energy. Under this circumstance, the magnetizing inductances may be equivalent as being connected in parallel to the primary windings T1A and T2A respectively. During the period from t0 to t1, the power conversion device 1 receives power from the input end and outputs power to the output terminal.

Figure 6B:
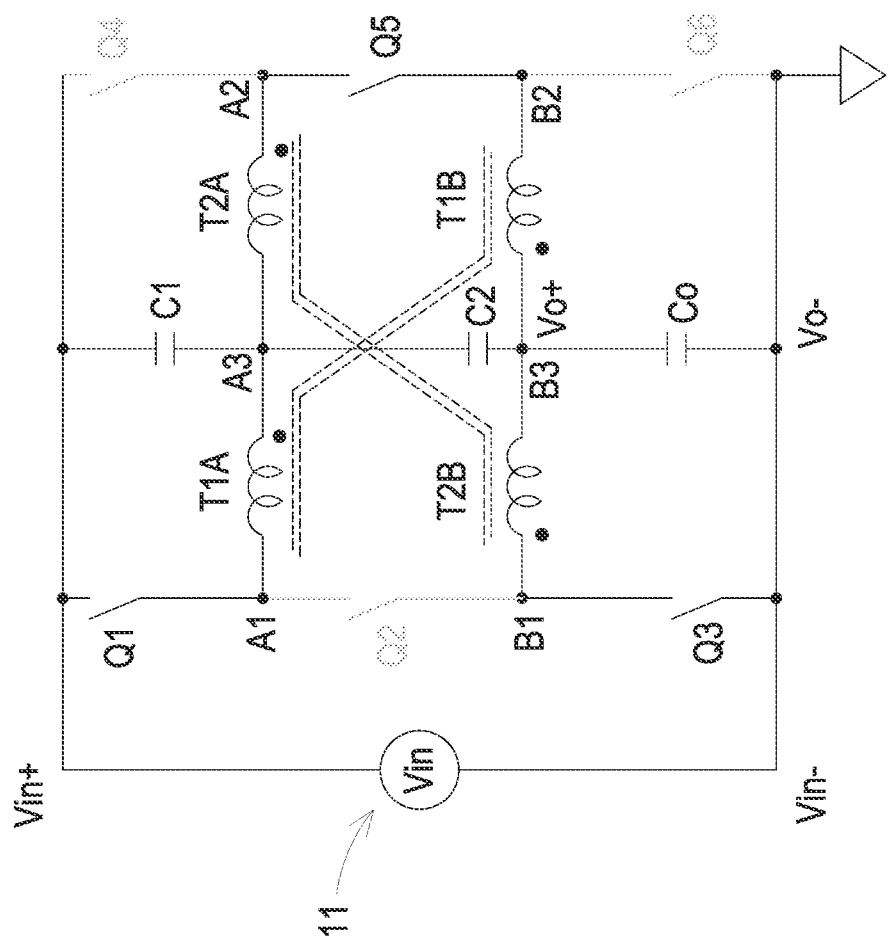

Referring to FIG. 5 and FIG. 6B, the first, third and fifth switches Q1, Q3 and Q5 are in the "ON" state, the second, fourth and sixth switches Q2, Q4 and Q6 are in the "OFF" state during the period from time t2 to t3, and the corresponding working states of the power conversion device 1 is shown in FIG. 6B, which is the same as that shown in FIG. 4A. In the working states shown in FIG. 6B, the voltage across the first transformer T1 is (Vin−2*N*Vo)/2, the magnetizing current flowing through the first transformer T1 increases in the positive direction while the first transformer T1 stores energy. The volt-second of the first transformer T1 is (Vin−2*N*Vo)*D*Ts. The magnetizing current flowing through the second transformer T2 decreases in the positive direction, and the magnetizing inductance of the second transformer T2 releases energy to the output terminal. Accordingly, during the period from t2 to t3, the power conversion device 1 receives power from the input end, and stores energy in the first transformer T1 while outputting power to the output terminal. Unlike the working states shown in FIG. 4A, in the working states shown in FIG. 6B, the first capacitor C1 and the second capacitor C2 are utilized to provide a path for the magnetizing currents flowing through the two transformers and to absorb a part of the energy.

Figure 6C:
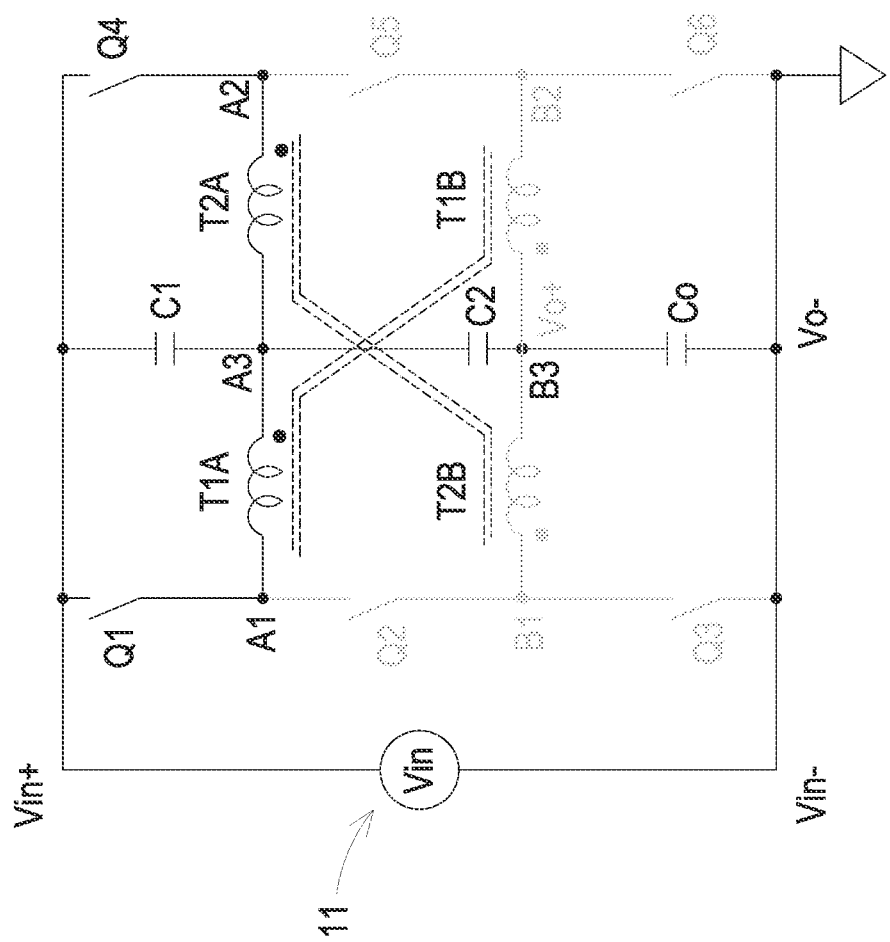

Referring to FIG. 5 and FIG. 6C, the first and fourth switches Q1 and Q4 are in the "ON" state, the second, third, fifth and sixth switches Q2, Q3, Q5 and Q6 are in the "OFF" state during the period from t4 to t5, and the corresponding working states is shown in FIG. 6C. Since the working states shown in FIG. 6C is the same as the working states shown in FIG. 6A, the detailed descriptions thereof are omitted herein.

Figure 6D:
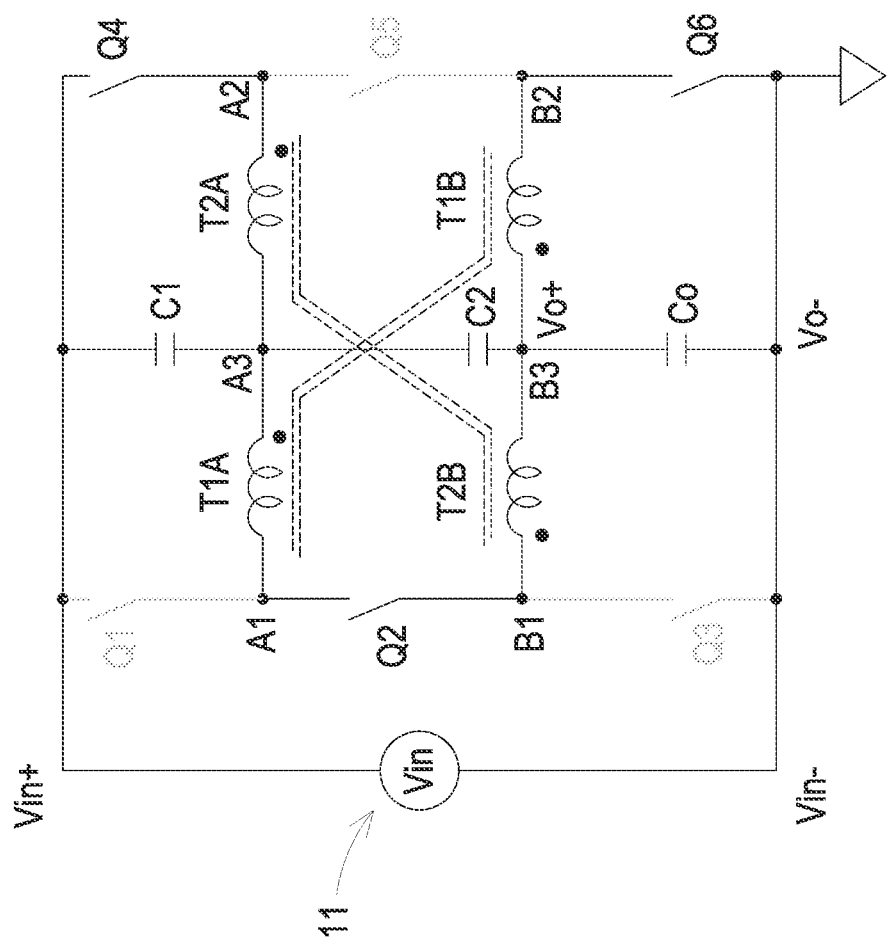

Please refer to FIG. 5 and FIG. 6D. During the period from time t6 to t7, the first, third and fifth switches Q1, Q3 and Q5 are in the "OFF" state, the second, fourth and sixth switches Q2, Q4 and Q6 are in the "ON" state, and the corresponding working states of the power conversion device 1 is shown in FIG. 6D, which is the same as that shown in FIG. 4C. In the working states shown in FIG. 6D, the voltage across the second transformer T2 is (Vin−2*N*Vo)/2, the magnetizing current flowing through the second transformer T2 increases in the positive direction, and the second transformer T2 stores energy. The volt-second of the second transformer T2 is (Vin−2*N*Vo)*D*Ts. The magnetizing current flowing through the first transformer T1 decreases in the positive direction, and the magnetizing inductance of the first transformer T1 releases energy to the output terminal. Accordingly, during the period from time t6 to t7, the power conversion device 1 receives power from the input end, outputs power to the output terminal, and meantime stores energy in the second transformer T2. Different from the working states shown in FIG. 4C, in the working states shown in FIG. 6D, the first capacitor C1 and the second capacitor C2 are utilized to provide a path for the magnetizing currents flowing through the two transformers and to absorb a part of the energy.

In FIG. 5, the period from t1 to t2, the period from t3 to t4, the period from t5 to t6, and the period from t7 to t8 are the dead time. During the dead time, the current is only commutated through the parasitic diode or parasitic capacitance of switch.

With the duty cycle D is greater than 0.5, in one switching cycle Ts (i.e., during the period from time t0 to t8 in FIG. 5), the volt-second of transformer T1 is (Vin−2*N*Vo)*0.5*D*Ts when the magnetizing current flowing through the first transformer T1 increases in the positive direction, and the volt-second of transformer T1 is Vo*(1−D)*Ts when the magnetizing current flowing through the first transformer T1 decreases in the positive direction. According to turns ratio of the transformers and the volt-second balance of the magnetic elements, the following equation is obtained:

$$[Vin-(N+1)*Vo]*D*Ts/(1+N)=Vo*(1-D)*Ts.$$

The output voltage Vo is formulated through simplifying the above equation as: Vo=Vin*D/(1+N).

From above, in the present disclosure, the output voltage Vo is regulated by adjusting the turn ratio of the primary windings T1A and T2A and the secondary windings T1B and T2B and the duty cycle D of the switches. Under the same input and output voltage conditions, the inductance of transformers T1 and T2 of the power conversion device 1 of the present disclosure have lower volt-second than a conventional buck converter, thus the voltage stress on switch is lower and the size of magnetic components are smaller. Therefore, it is possible to reduce the cost and increase the power density by using smaller magnetic components and low voltage switches. Moreover, compared with the conventional hard-switching full-bridge converter, the transformers T1 and T2 of the power conversion device 1 of the present disclosure have fewer turns of the primary windings T1A and T2A, and the current flowing through the secondary windings T1B and T2B is continuous with smaller RMS value while the duty cycle D being less than or equal to 0.5, resulting in a reduction in the number of PCB layers. Furthermore, in the present disclosure, the duty cycle D of switches can be greater than 0.5, allowing for a wider range of input and output voltages. In addition, the present disclosure can adjust the N in the transformer turns ratio according to different input and output voltage ranges, making the design more flexible and convenient.

Figure 7A:
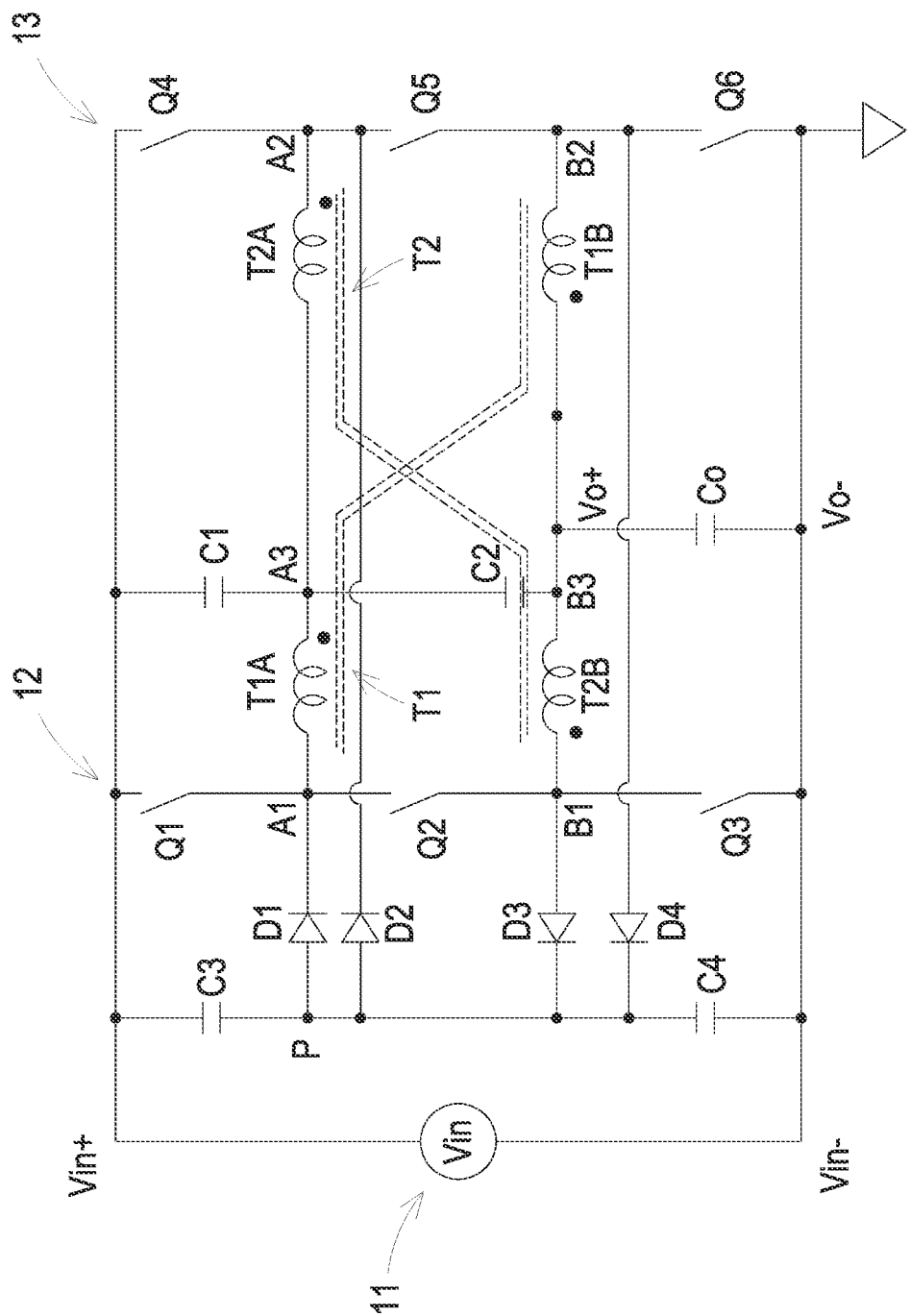
FIG. 7A, FIG. 7B, FIG. 7C, FIG. 8, FIG. 9 and FIG. 10A are schematic circuit diagrams showing different variants of the power conversion device of FIG. 1.

In an embodiment, as shown in FIG. 7A, the power conversion device 1 further includes a clamping circuit, and the clamping circuit includes a clamping capacitor, a first diode D1, a second diode D2, a third diode D3 and a fourth diode D4. A first terminal of the clamping capacitor is electrically connected to a node with a fixed potential, and a second terminal of the clamping capacitor is electrically connected to a clamping node P. The node with a fixed potential can be defined as the positive input terminal Vin+, the negative input terminal Vin−, the positive output terminal Vo+ or a positive terminal of an additional voltage source. The anode and the cathode of the first diode D1 are electrically connected to the clamping node P and the first primary node A1 respectively. The anode and the cathode of the second diode D2 are electrically connected to the clamping node P and the second primary node A2 respectively. The anode and the cathode of the third diode D3 are electrically connected to the first secondary node B1 and the clamping node P respectively. The anode and the cathode of the fourth diode D4 are electrically connected to the second secondary node B2 and the clamping node P respectively.

In the embodiment shown in FIG. 7A, the clamping capacitor includes a third capacitor C3 and a fourth capacitor C4. Two terminals of the third capacitor C3 are electrically connected to the positive input terminal Vin+ and the clamping node P respectively. Two terminals of the fourth capacitor C4 are electrically connected to the negative input terminal Vin− and the clamping node P respectively. The voltage on the clamping node P is equal to 0.5*Vin. According to the previous descriptions about the working states, the voltages on the first and second primary nodes A1 and A2 jump between 0.5*Vin and Vin, and the voltages on the first and second secondary nodes B1 and B2 jump between 0 and 0.5*Vin. Therefore, the first and second primary nodes A1 and A2 and the first and second secondary nodes B1 and B2 are electrically connected to the clamping node P through the corresponding diode respectively, which can effectively control the voltage stress on the switches without additional losses.

Figure 7B:
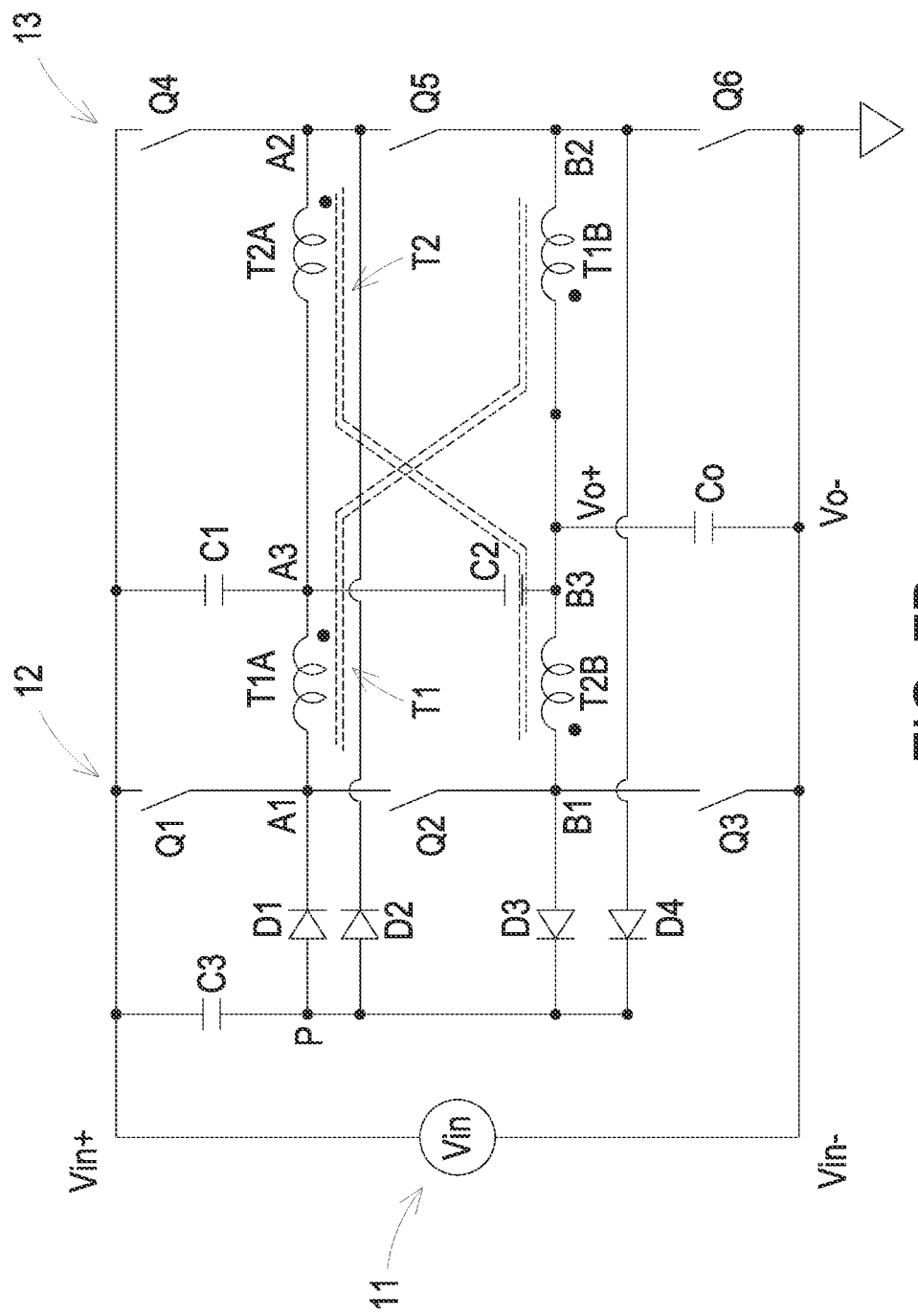
Figure 7C:
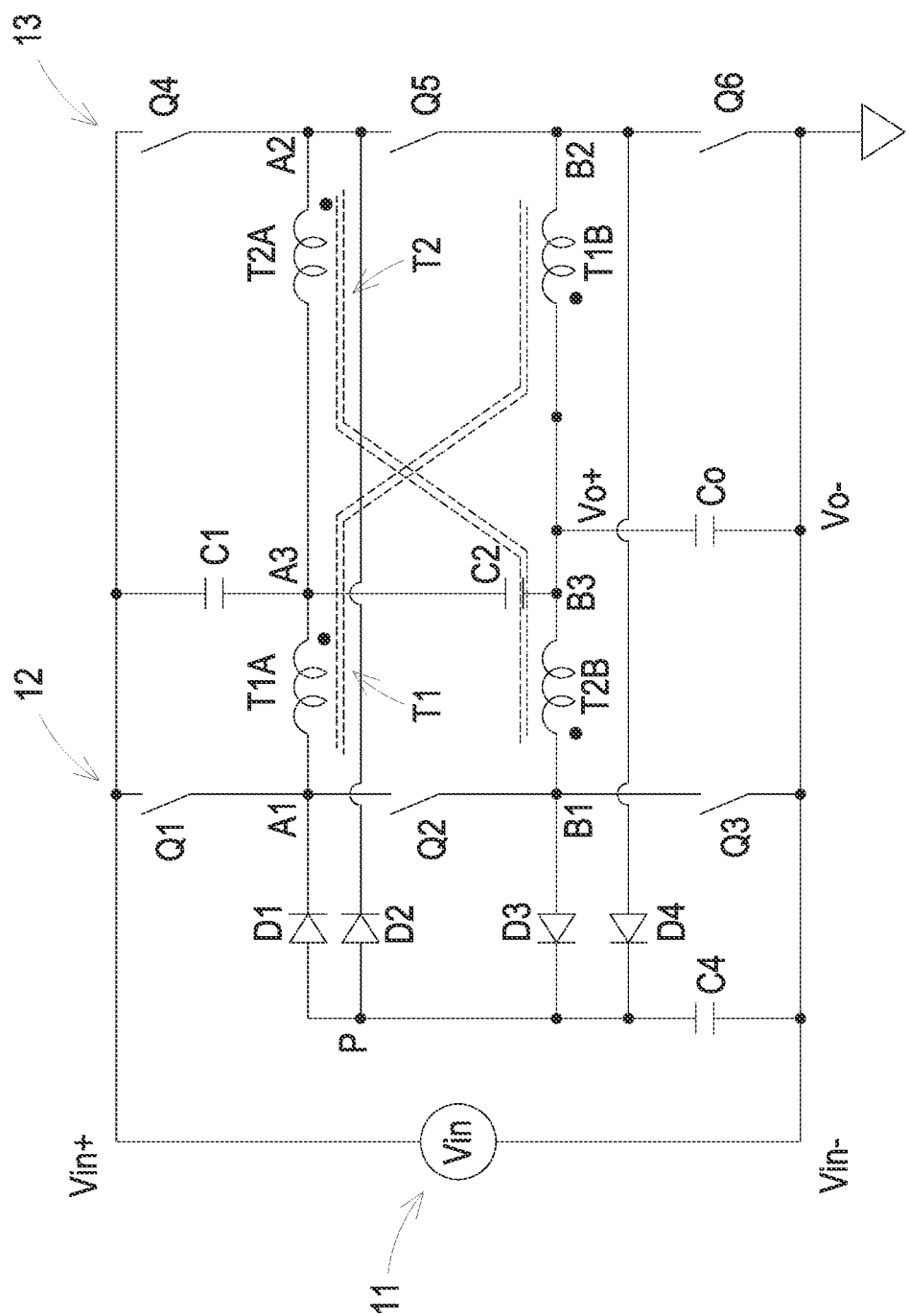

In addition, the actual implementation of the clamping capacitor is not limited to that shown in FIG. 7A. In another embodiment, as shown in FIG. 7B, the clamping capacitor only includes a third capacitor C3. Two terminals of the third capacitor C3 are electrically connected to the positive input terminal Vin+ and the clamping node P respectively. The node with a fixed potential to which the third capacitor C3 is connected can be changed to the positive output terminal Vo+ or a positive terminal of an external voltage source according to actual requirements. In further another embodiment, as shown in FIG. 7C, the clamping capacitor only includes a fourth capacitor C4. Two terminals of the fourth capacitor C4 are electrically connected to the negative input terminal Vin− and the clamping node P respectively. The node with a fixed potential to which the fourth capacitor C4 is connected can be replaced by the positive output terminal Vo+ or the positive terminal of an external voltage source as appropriate.

Figure 8:
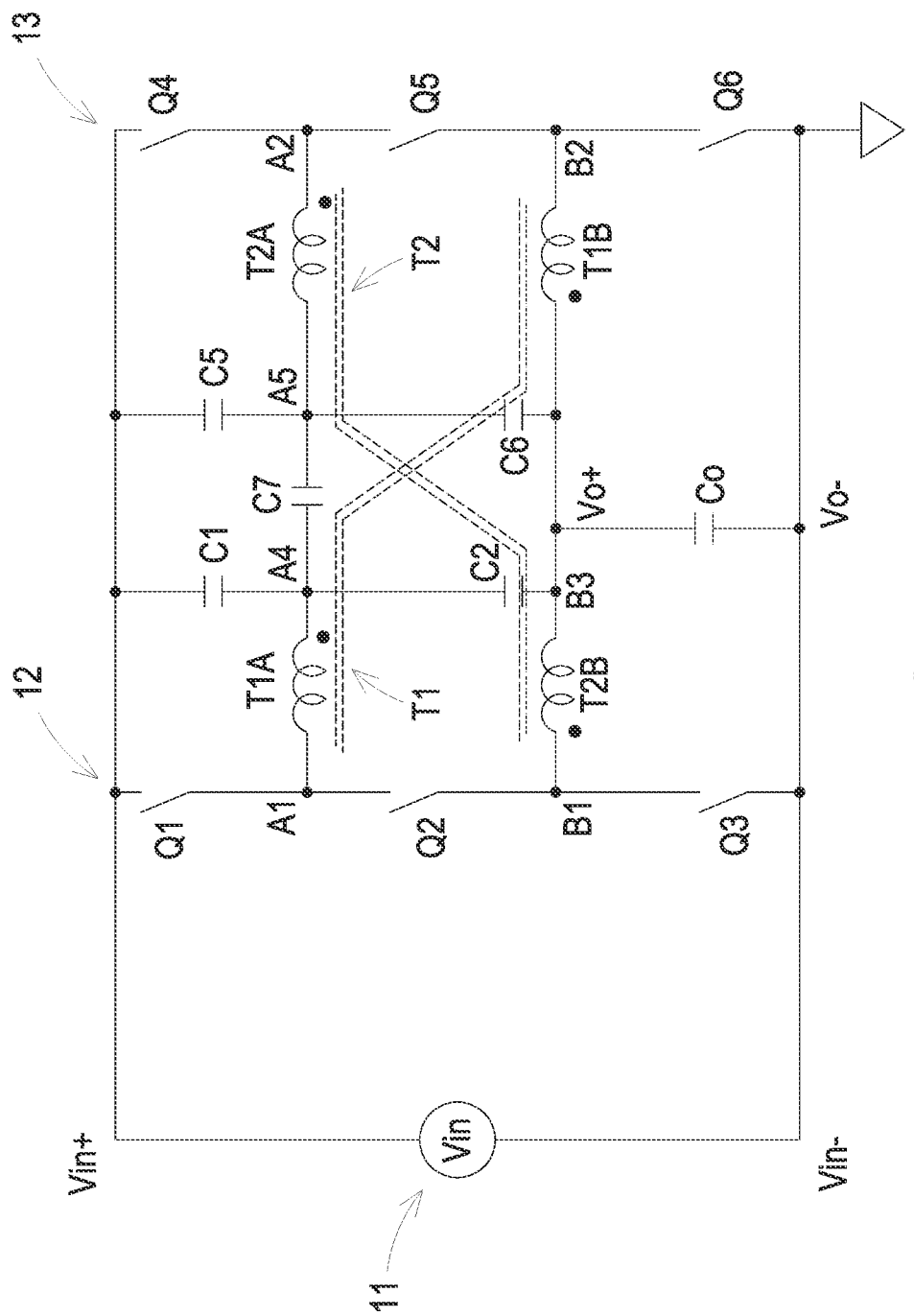

In an embodiment, as shown in FIG. 8, the power conversion device 1 further includes a fifth capacitor C5, a sixth capacitor C6 and a seventh capacitor C7. The seventh capacitor C7 is electrically connected in series between the two primary windings T1A and T2A as a blocking capacitor to block the DC current, thus suppressing the magnetic bias caused by the DC current. The first terminals of the first capacitor C1 and the fifth capacitor C5 are both electrically connected to the positive input terminal Vin+. The second terminals of the first capacitor C1 and the fifth capacitor C5 are electrically connected to the two terminals of the seventh capacitor C7 (i.e., the nodes A4 and A5) respectively. The first terminals of the second capacitor C2 and the sixth capacitor C6 are both electrically connected to the positive output terminal Vo+. The second terminals of the second capacitor C2 and the sixth capacitor C6 are electrically connected to the two terminals of the seventh capacitor C7 respectively.

Figure 9:
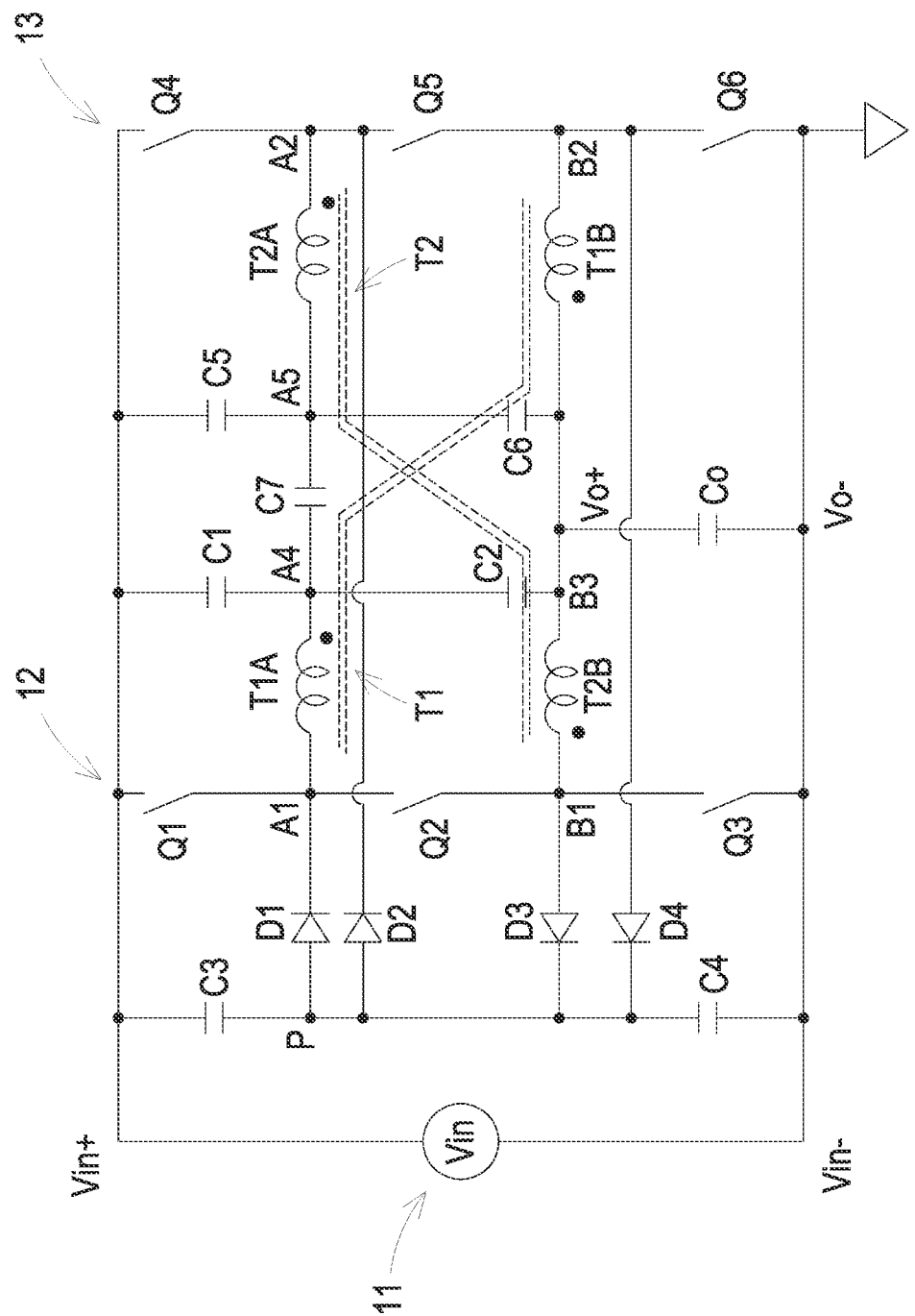

In other embodiments, the circuit shown in FIG. 8 can further combine a clamping circuit mentioned above. As exemplified the circuit shown in FIG. 9, combines the clamping circuit shown in FIG. 7A with the circuit shown in FIG. 8. In FIG. 9, based on the principle of voltage division of capacitors, the voltage stresses on the first, second, fourth and fifth switches Q1, Q2, Q4 and Q5 can be controlled within the rated voltage range by designing the capacitances of the capacitors C1 to C6.

Figure 10A:
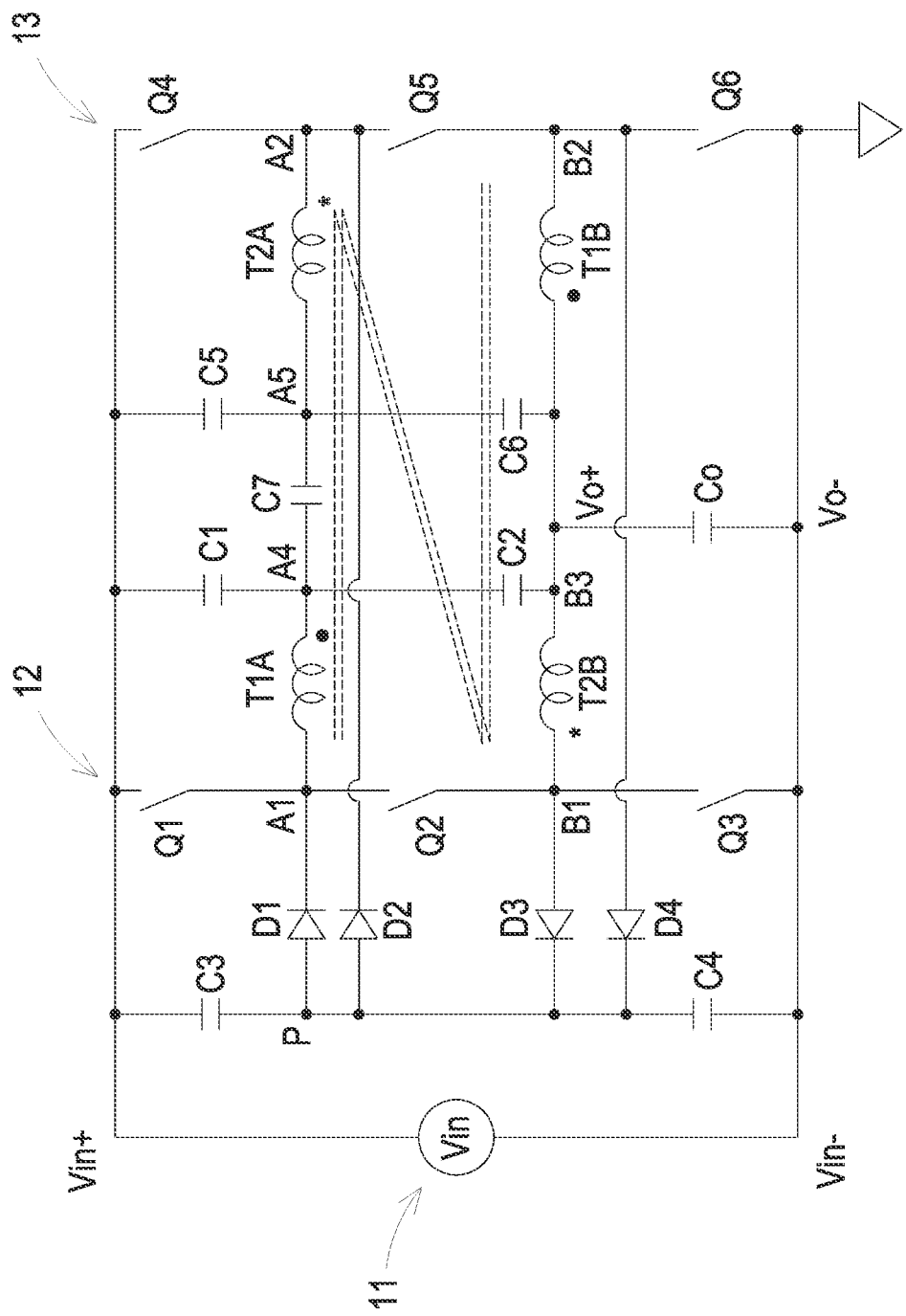

In the above embodiments, the first transformer T1 and the second transformer T2 are two separated transformers, the primary winding T1A is coupled to the secondary winding T1B, and the primary winding T2A is coupled to the secondary winding T2B. However, in other embodiments, as shown in FIG. 10A, the four windings (such as the primary windings T1A and T2A and the secondary windings T1B and T2B) are all coupled to each other. In order to realize the winding coupling of FIG. 10A, the windings of the first transformer T1 and the second transformer T2 can be wound around the same magnetic core assembly using magnetic integration technology. Two possible winding manners and structures of magnetic core assembly are exemplified as follows in FIG. 10B and FIG. 10C respectively, but the actual implementation thereof is not limited thereto.

Figure 10B:
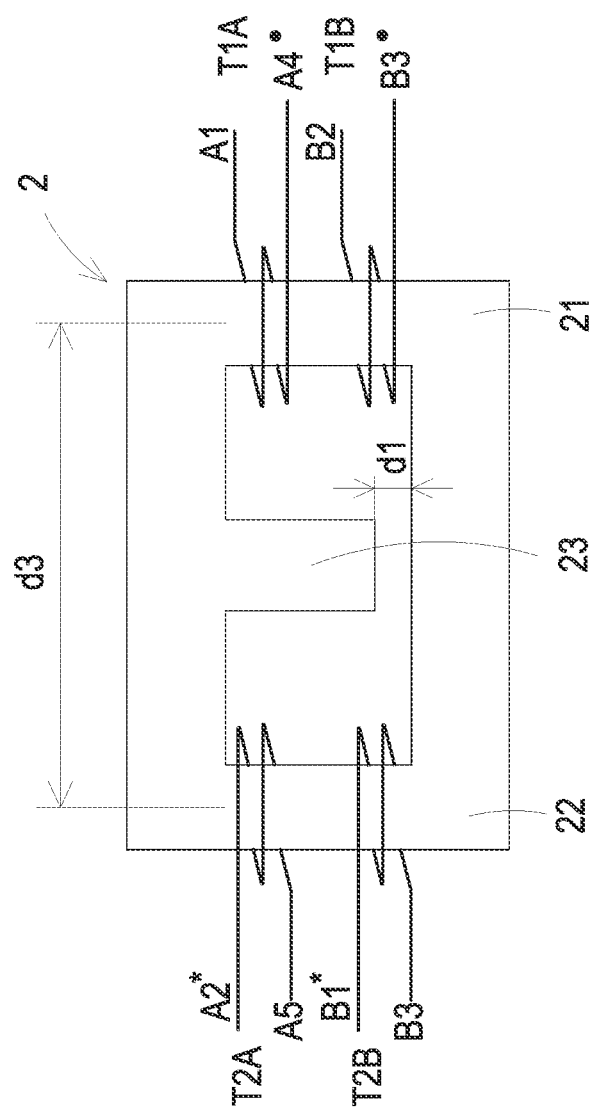
FIG. 10B and FIG. 10C schematically show different implementations of the windings of the transformers of FIG. 10A being wound around the same magnetic core assembly.

As shown in FIG. 10B, the first transformer T1 and the second transformer T2 are magnetically integrated to form an integrated magnetic component. The integrated magnetic component includes a magnetic core assembly 2, primary windings T1A and T2A, and secondary windings T1B and T2B. The magnetic core assembly 2 includes two winding pillars 21 and 22 and a middle pillar 23. The primary winding T1A and the secondary winding T1B of the first transformer T1 are wound around the winding pillar 21. The primary winding T2A and the secondary winding T2B of the second transformer T2 are wound around the winding pillar 22. The length of an air gap d1 on the middle pillar 23 is longer than the length of the air gaps (not shown) on the winding pillars 21 and 22. By the winding direction adopted in FIG. 10B, the DC magnetic fluxes on the two winding pillars 21 and 22 are superimposed on the middle pillar 23 and the AC magnetic fluxes of the two winding pillars 21 and 22 are partially or completely cancelled each other on the middle pillar 23. Consequently, the ripple current flowing through the windings can be substantially reduced.

Figure 10C:
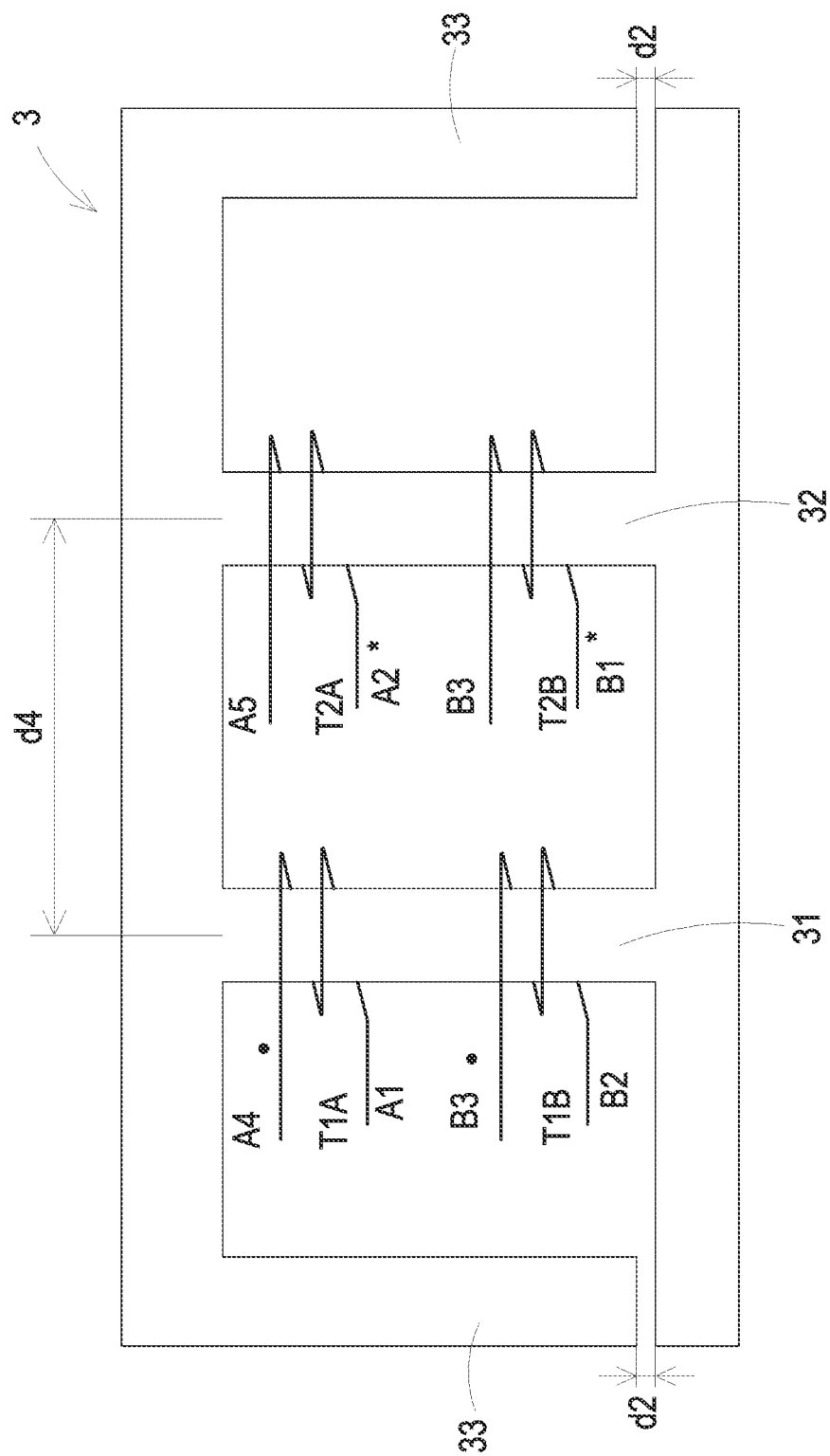

As shown in FIG. 10C, the first transformer T1 and the second transformer T2 are magnetic integrated to form an integrated magnetic component. The integrated magnetic component includes a magnetic core assembly 3, primary windings T1A and T2A, and secondary windings T1B and T2B. The magnetic core assembly 3 includes two winding pillars 31 and 32 and two side pillars 33. The primary winding T1A and the secondary winding T1B of the first transformer T1 are wound around the winding pillar 31. The primary winding T2A and the secondary winding T2B of the second transformer T2 are wound around the winding pillar 32. The length of the air gaps d2 on the two side pillars 33 is longer than the length of the air gaps (not shown) on the winding pillars 31 and 32. By the winding direction adopted in FIG. 10C, the DC magnetic fluxes of the two winding pillars 31 and 32 are superimposed on the two side pillars 33 and the AC magnetic fluxes of the two winding pillars 31 and 32 are partially or completely cancelled each other on the two side pillar 33. Consequently, the ripple current flowing through the windings can be greatly reduced. Compared with the implementation shown in FIG. 10B, the distance d4 between the two winding pillars 31 and 32 in the implementation shown in FIG. 10C is shorter than the distance d3 between the two winding pillars 21 and 22 shown in FIG. 10B (the distance between the winding pillars is equal to the distance between the central positions of the two winding pillars), the AC circuit loop at the side of the secondary windings T1B and T2B (i.e., the circuit loop formed by the secondary windings T1B and T2B and the output terminal of the power conversion device 1) is shorter, thus the leakage inductance of the transformers T1 and T2 can be further decreased, and the winding loss.

Figure 11:
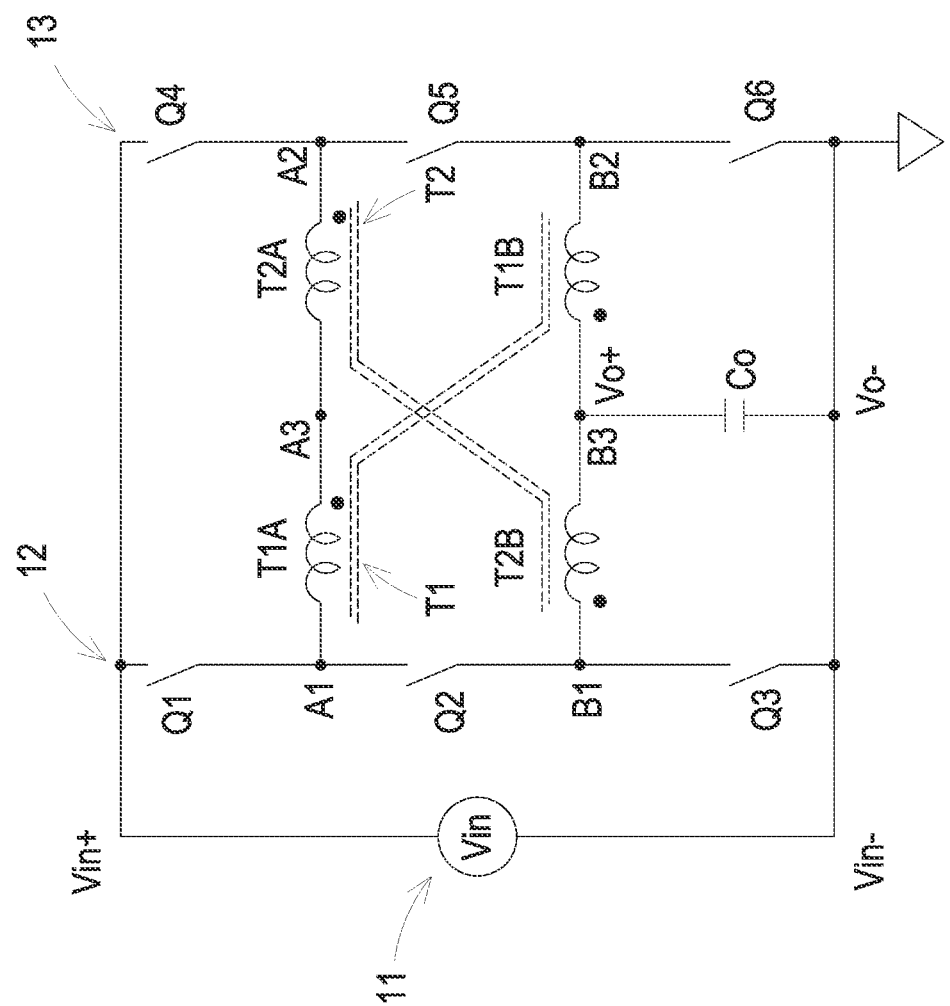
FIG. 11 is a schematic circuit diagram showing a variant of the power conversion device of FIG. 1 when the duty cycle being less than or equal to 0.5.

In other embodiments, under the situation that the duty cycle D is less than or equal to 0.5, the first capacitor C1 and the second capacitor C2 in the power conversion device 1 of FIG. 1 can be cancelled, and the corresponding circuit is shown in FIG. 11. The circuit shown in FIG. 11 can achieve the same function through the control manner described above, and the detailed descriptions thereof are omitted herein.

Figure 12:
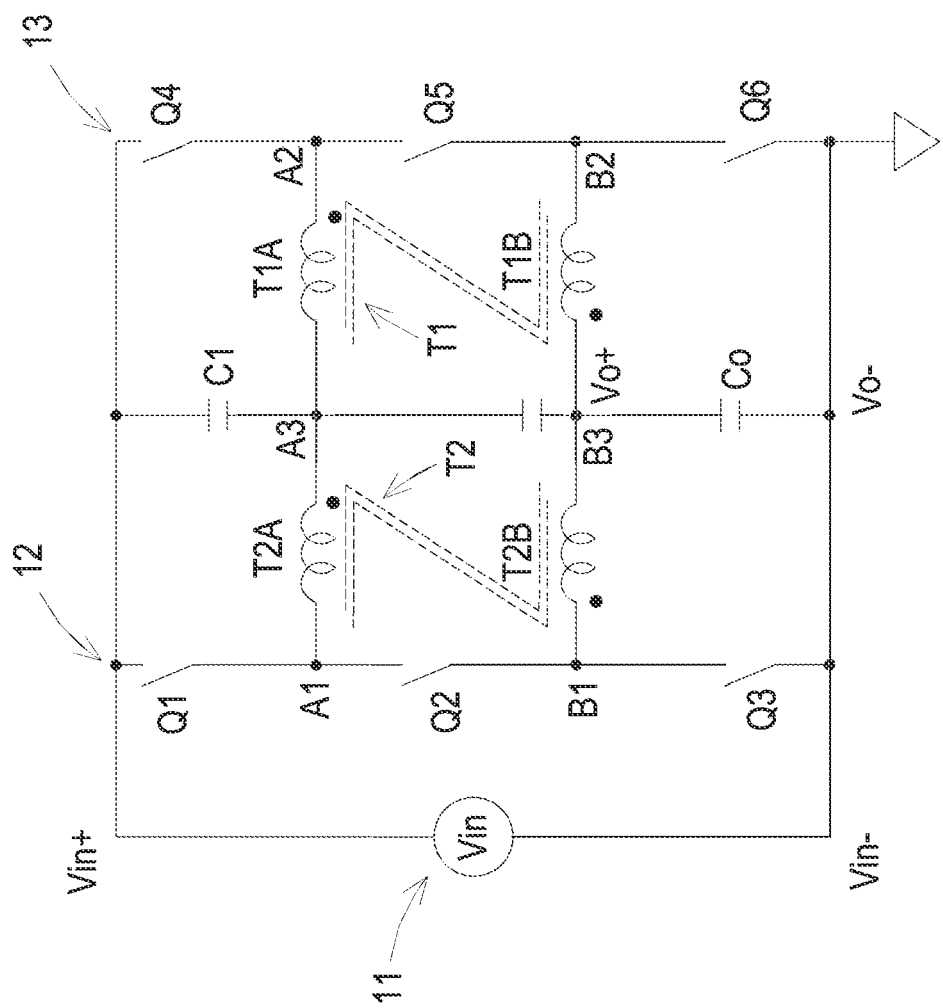
FIG. 12 is a schematic circuit diagram illustrating a power conversion device according to another embodiment of the present disclosure.
Figure 13:
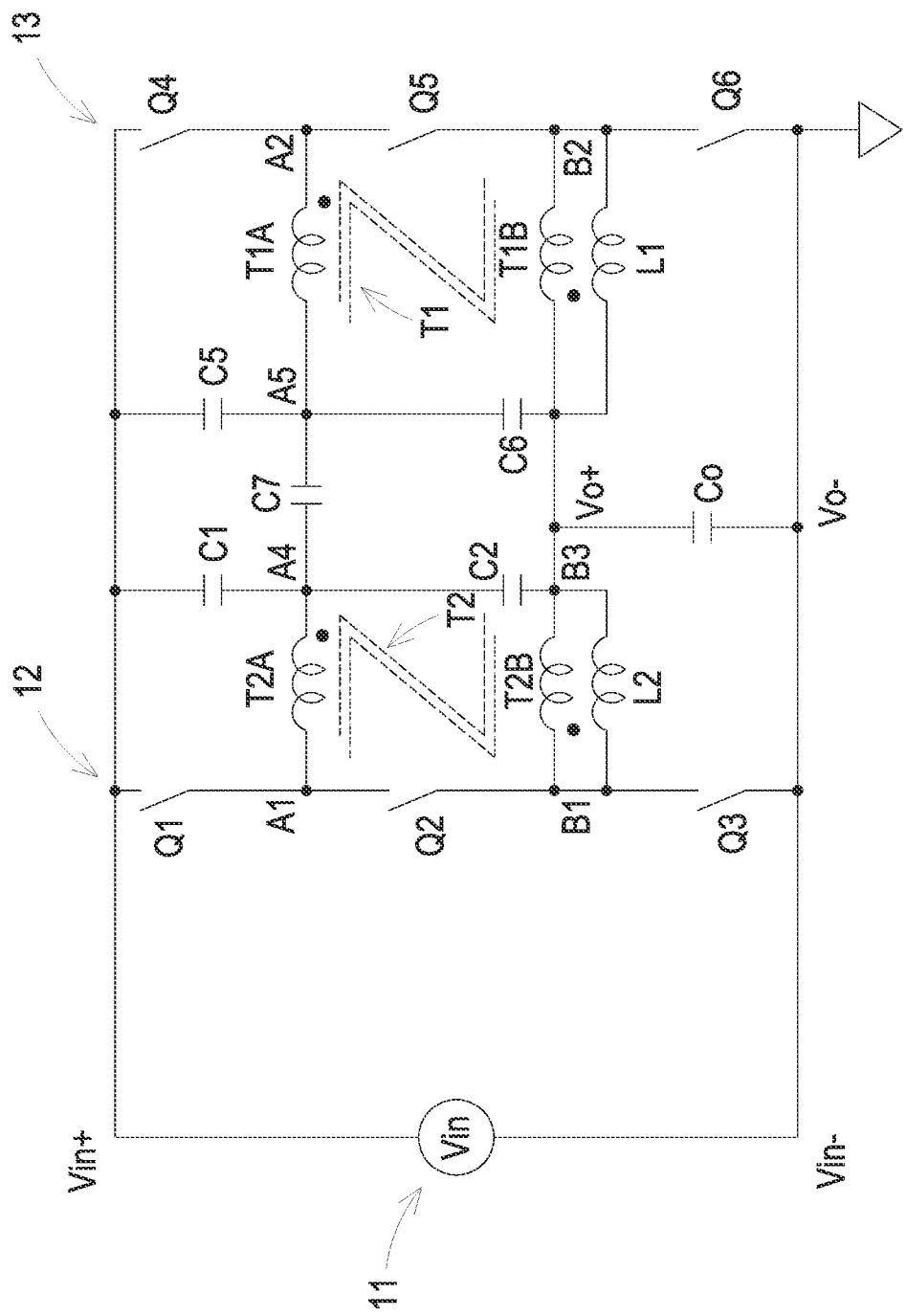
FIG. 13 and FIG. 14 are schematic circuit diagrams showing different variants of the power conversion device of FIG. 12.
Figure 14:
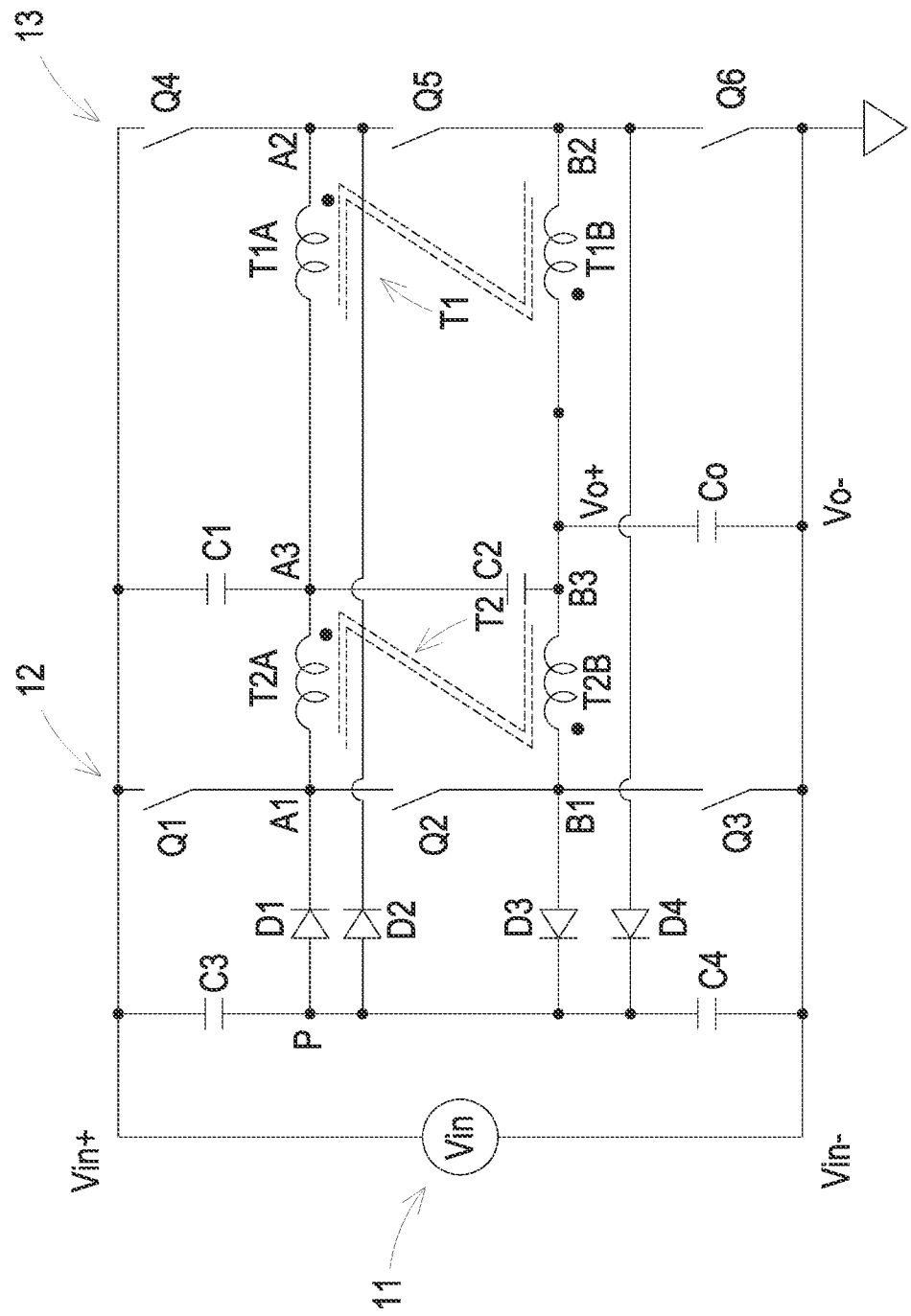

In other embodiments, the disposed positions of the primary windings T1A and T2A shown in FIG. 1 can be exchanged with each other. In particular, as shown in FIG. 12, the primary winding T1A of the first transformer T1 is electrically connected between the second primary node A2 and the third primary node A3 and the primary winding T2A of the second transformer T2 is electrically connected between the first primary side A1 and the third primary node A3. The disposed positions of the secondary windings T1B and T2B are the same as that in FIG. 1. The corresponding control manner and working principle are basically the same. However, in the power conversion device 1 shown in FIG. 12, when the duty cycle D is less than or equal to 0.5, the potential at the third primary node A3 becomes Vin−N*Vo during the period of the first switch Q1 being turned on and the period of the second switch Q2 being turned on. When the duty cycle D is greater than 0.5, the potential at the third primary node A3 becomes Vin−N*Vo during the period of the second switch Q2 being turned on and the period of the third switch Q3 being turned on. Correspondingly, FIG. 13 shows the circuit which combines the power conversion device of FIG. 11 with the blocking capacitor mentioned above, and FIG. 14 shows the circuit which combines the power conversion device of FIG. 11 with the clamping circuit mentioned above. Since the principle and technique effect are the same as that described above, the detailed descriptions thereof are omitted herein.

Figure 15:
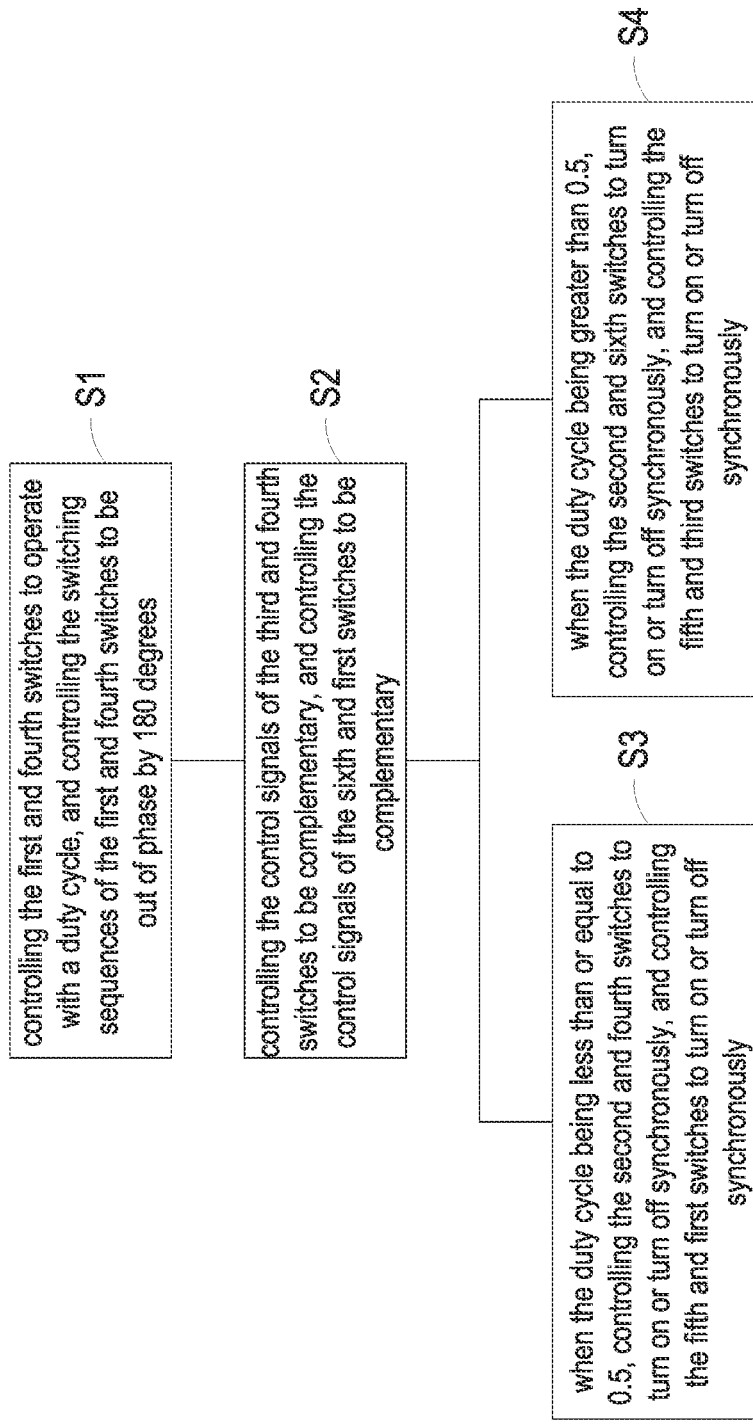
FIG. 15 is a schematic flow chart illustrating a control method of a power conversion device according to an embodiment of the present disclosure.

FIG. 15 is a schematic flow chart illustrating a control method for a power conversion device according to an embodiment of the present disclosure. The control method of the present disclosure can be applied to control the power conversion device in each of the preceding embodiments. As shown in FIG. 15, the control method includes steps S1, S2, S3 and S4.

In the step S1, the first switch Q1 and the fourth switch Q4 are controlled to operate with the duty cycle D, and the switching sequences of the first switch Q1 and the fourth switch Q4 are controlled to be out of phase by 180 degrees with respect to each other.

In the step S2, the control signals of the third switch Q3 and the fourth switch Q4 are controlled to be complementary, and the control signals of the sixth switch Q6 and the first switch Q1 are controlled to be complementary.

In the step S3, when the duty cycle D is less than or equal to 0.5, the second switch Q2 and the fourth switch Q4 are controlled to turn on or turn off synchronously, and the fifth switch Q5 and the first switch Q1 are controlled to turn on or turn off synchronously.

In the step S4, when the duty cycle D is greater than 0.5, the second switch Q2 and the sixth switch Q6 are controlled to turn on or turn off synchronously, and the fifth switch Q5 and the third switch Q3 are controlled to turn on or turn off synchronously.

In an embodiment, the control method further includes a substep: generating a first control signal PWM1, a second control signal PWM2, a third control signal PWM3 and a fourth control signal PWM4 for controlling the switches in the first and second bridge arms 12 and 13. The first and second control signals PWM1 and PWM2 have the duty cycle D and are out of phase by 180 degrees with respect to each other. The third control signal PWM3 and the first control signal PWM1 are complementary, and the fourth control signal PWM4 and the second control signal PWM2 are complementary.

Moreover, the control method further includes substeps: controlling the first switch Q1, the fourth switch Q4, the sixth switch Q6 and the third switch Q3 by the first control signal PWM1, the second control signal PWM2, the third control signal PWM3 and the fourth control signal PWM4 respectively; controlling the second switch Q2 and the fifth switch Q5 by the second control signal PWM2 and the first control signal PWM1 respectively when the duty cycle D being less than or equal to 0.5; and controlling the second switch Q2 and the fifth switch Q5 by the third control signal PWM3 and the fourth control signal PWM4 respectively when the duty cycle D being greater than 0.5.

In summary, the present disclosure provides a control method of a power conversion device to achieve the output voltage regulation by adjusting the turn ratio of the primary windings and the secondary windings and the duty cycle of the switches. Under the same input and output voltage conditions, compared with the conventional buck converter, the transformers of the power conversion device of the present disclosure have lower volt-second on the inductor, thus the voltage stress on switch is lower and the size of magnetic elements becomes smaller. Therefore, the smaller magnetic element and switches with low voltage can be adopted to reduce the cost and improve the power density.

Moreover, compared with the conventional hard-switching full-bridge converter, the primary windings of the transformers of the power conversion device mentioned in the present disclosures have fewer turns. In addition, since the current flowing through the secondary windings is continuous while the duty cycle being less than or equal to 0.5, the current effective value is smaller. Consequently, the number of the layers of PCB is reduced. Furthermore, in the present disclosure, the duty cycle of switches can be greater than 0.5, allowing for a wider input and output voltage range. In addition, the N in the transformer turns ratio can be adjusted according to different input and output voltage ranges in the present disclosure, which is more flexible and convenient for design.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for controlling a power conversion device, comprising:
   providing the power conversion device, wherein the power conversion device comprises a first bridge arm, a second bridge arm and two transformers, the first bridge arm and the second bridge arm are electrically connected in parallel, the first bridge arm comprises a first switch, a second switch and a third switch coupled in series, a first primary node is defined by a junction node between the first switch and the second switch, a first secondary node is defined by a junction node between the second switch and the third switch, the second bridge arm comprises a fourth switch, a fifth switch and a sixth switch coupled in series, a second primary node is defined by a junction node between the fourth switch and the fifth switch, a second secondary node is defined by a junction node between the fifth switch and the sixth switch, each of the two transformers comprises a primary winding and a secondary winding, two said primary windings of the two transformers are coupled in series between the first primary node and the second primary node, two said secondary windings of the two transformers are coupled in series between the first secondary node and the second secondary node;
   controlling the first switch and the fourth switch to operate with a duty cycle, wherein a control signal of the first switch and a control signal of the fourth switch have a phase difference by 180 degrees with respect to each other;
   controlling the third switch and the fourth switch, wherein a control signal of the third switch and the control signal of the fourth switch are complementary; and
   controlling the sixth switch, wherein a control signal of the sixth switch and the control signal of the first switch are complementary,
   wherein when the duty cycle is less than or equal to 0.5, the second switch and the fourth switch are turned on or turned off synchronously, and the fifth switch and the first switch are turned on or turned off synchronously;
   wherein when the duty cycle is greater than 0.5, the second switch and the sixth switch are turned on or turned off synchronously, and the fifth switch and the third switch are turned on or turned off synchronously.

2. The control method according to claim 1, further comprising: generating a first control signal, a second control signal, a third control signal and a fourth control signal for controlling the switches in the first bridge arm and the second bridge arm, wherein the first control signal and the second control signal have the duty cycle and have a phase difference by 180 degrees with respect to each other, and the third control signal and the first control signal are complementary, and the fourth control signal and the second control signal are complementary.

3. The control method according to claim 2, further comprising: controlling the first switch, the fourth switch, the sixth switch and the third switch by the first control signal, the second control signal, the third control signal and the fourth control signal, respectively.

4. The control method according to claim 2, further comprising: controlling the second switch and the fifth switch by the second control signal and the first control signal respectively when the duty cycle being less than or equal to 0.5.

5. The control method according to claim 2, further comprising: controlling the second switch and the fifth switch by the third control signal and the fourth control signal respectively when the duty cycle being greater than 0.5.

6. The control method according to claim 1, wherein the power conversion device further comprises an input end having a positive input terminal and a negative input terminal, and the first bridge arm and the second bridge arm are connected to the input end in parallel.

7. The control method according to claim 6, wherein the power conversion device further comprises an output capacitor, and a third secondary node is defined by a junction node of the two secondary windings, a third primary node is defined by a junction node of the two primary windings, wherein two terminals of the output capacitor are electrically connected to a positive output terminal and a negative output terminal respectively, the positive output terminal is coupled to the third secondary node, and the negative output terminal is coupled to the negative input terminal.

8. The control method according to claim 7, wherein the two transformers comprise a first transformer and a second transformer, the primary winding of the first transformer is electrically connected between the first primary node and the third primary node, the secondary winding of the first transformer is electrically connected between the second secondary node and the third secondary node, the primary winding of the second transformer is electrically connected between the second primary node and the third primary node, and the secondary winding of the second transformer is electrically connected between the first secondary node and the third secondary node.

9. The control method according to claim 8, wherein turns ratio of the primary winding of the first transformer, the primary winding of the second transformer, the secondary winding of the first transformer, and the secondary winding of the second transformer is N:N:1:1, where N is a positive integer.

10. The control method according to claim 9, wherein a relation between an output voltage and an input voltage of the power conversion device is formulated as:

$$Vo = Vin \cdot D/(1+N),$$

where Vo represents the output voltage, Vin represents the input voltage, and D represents the duty cycle.

11. The control method according to claim 7, wherein the two transformers comprise a first transformer and a second transformer, the primary winding of the first transformer is electrically connected between the second primary node and the third primary node, the secondary winding of the first transformer is electrically connected between the second secondary node and the third secondary node, the primary winding of the second transformer is electrically connected between the first primary node and the third primary node, and the secondary winding of the second transformer is electrically connected between the first secondary node and the third secondary node.

12. The control method according to claim 11, wherein turns ratio of the primary winding of the first transformer, the primary winding of the second transformer, the secondary winding of the first transformer, and the secondary winding of the second transformer is N:N:1:1, where N is a positive integer.

13. The control method according to claim 12, wherein a relation between an output voltage and an input voltage of the power conversion device is formulated as:

$$Vo = Vin \cdot D/(1+N),$$

where Vo represents the output voltage, Vin represents the input voltage, and D represents the duty cycle.

14. The control method according to claim 1, wherein the third switch and the sixth switch are diodes.

* * * * *